(12) United States Patent
Lin et al.

(10) Patent No.: US 12,177,732 B2
(45) Date of Patent: Dec. 24, 2024

(54) NETWORK HANDOVER METHOD AND TERMINAL DEVICE

(71) Applicant: Huawei Technologies Co., Ltd., Shenzhen (CN)

(72) Inventors: Lixin Lin, Shanghai (CN); Yuwei Fan, Shanghai (CN); Fengguang Qiu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 334 days.

(21) Appl. No.: 17/761,528

(22) PCT Filed: Jul. 28, 2020

(86) PCT No.: PCT/CN2020/105281
§ 371 (c)(1),
(2) Date: Mar. 17, 2022

(87) PCT Pub. No.: WO2021/052014
PCT Pub. Date: Mar. 25, 2021

(65) Prior Publication Data
US 2022/0345955 A1    Oct. 27, 2022

(30) Foreign Application Priority Data
Sep. 18, 2019   (CN) .......................... 201910882938.3

(51) Int. Cl.
*H04W 36/00*   (2009.01)
*H04W 36/14*   (2009.01)
(Continued)

(52) U.S. Cl.
CPC .... *H04W 36/0066* (2013.01); *H04W 36/0011* (2013.01); *H04W 36/144* (2023.05);
(Continued)

(58) Field of Classification Search
CPC ....................................................... H04L 43/50
See application file for complete search history.

(56) References Cited

U.S. PATENT DOCUMENTS

| 10,560,881 B2 | 2/2020 | Ding et al. |
| 2011/0188472 A1 | 8/2011 | Jeon et al. |

(Continued)

FOREIGN PATENT DOCUMENTS

| CN | 101674637 A | 3/2010 |
| CN | 106488491 A | 3/2017 |

(Continued)

OTHER PUBLICATIONS

"Inter-RAT Release and Redirect in 2-steps Procedure," Agenda Item: 10.4.1.3.7 Connection Release Procedure, Source: Ericsson, Document for: Discussion, Decision, 3GPP TSG-RAN WG2#104, Tdoc R2-1817209, XP051556747, Spokane, Washington, USA, Nov. 12-16, 2018, 6 pages.

*Primary Examiner* — Charles N Appiah
*Assistant Examiner* — Frank E Donado
(74) *Attorney, Agent, or Firm* — SLATER MATSIL, LLP

(57) ABSTRACT

A network handover method and a terminal device, the method including obtaining, by a terminal device, a link quality parameter of a data link of the terminal device, determining that a 5G system accessed by the terminal device is unavailable in response to the link quality parameter meeting a specified condition, and handing over from the 5G system to a non-5G system in response to the 5G system being unavailable, where the link quality parameter includes quantities of uplink and downlink data packets received in a duration, and here the specified condition comprises the quantity of downlink data packets received in the duration by exceeding a first threshold and a quantity of sent uplink data packets being 0, or a quantity of uplink data (Continued)

packets sent in the duration exceeding a second threshold and the quantity of received downlink data packets being 0.

20 Claims, 25 Drawing Sheets

(51) Int. Cl.
    *H04W 36/30*     (2009.01)
    *H04W 36/36*     (2009.01)

(52) U.S. Cl.
    CPC ....... *H04W 36/302* (2023.05); *H04W 36/305* (2018.08); *H04W 36/362* (2023.05)

(56) References Cited

U.S. PATENT DOCUMENTS

| | | | |
|---|---|---|---|
| 2014/0010106 A1* | 1/2014 | Yoshimura | H04W 36/22 370/253 |
| 2016/0373984 A1 | 12/2016 | Hara | |
| 2017/0208488 A1 | 7/2017 | Hwang et al. | |
| 2018/0220470 A1 | 8/2018 | Zacharias et al. | |
| 2019/0059021 A1* | 2/2019 | Corroy | H04W 36/22 |
| 2019/0069205 A1 | 2/2019 | Lee et al. | |
| 2019/0223091 A1 | 7/2019 | Huang-Fu et al. | |
| 2019/0274180 A1 | 9/2019 | Yu et al. | |
| 2020/0305225 A1* | 9/2020 | Zhang | H04W 36/00222 |
| 2020/0314702 A1* | 10/2020 | Rahman | H04W 36/0069 |
| 2020/0383027 A1* | 12/2020 | Venkataraman | H04W 36/0094 |
| 2020/0383046 A1* | 12/2020 | Nayak | H04W 52/0245 |
| 2021/0136859 A1* | 5/2021 | Yoo | H04W 76/25 |
| 2023/0145867 A1* | 5/2023 | Ingale | H04W 76/19 370/331 |

FOREIGN PATENT DOCUMENTS

| | | |
|---|---|---|
| CN | 107534914 A | 1/2018 |
| CN | 109495909 A | 3/2019 |
| CN | 109963312 A | 7/2019 |
| CN | 110944369 A | 3/2020 |
| WO | 2018107894 A1 | 6/2018 |
| WO | 2018188728 A1 | 10/2018 |
| WO | 2018212613 A1 | 11/2018 |

* cited by examiner

NETWORK HANDOVER METHOD AND TERMINAL DEVICE

CROSS REFERENCE TO RELATED APPLICATIONS

This application claims priority to International Application No. PCT/CN2020/105281 (PCT Publication NO. WO2021052014), filed on Jul. 28, 2020, which claims priority to Chinese Patent Application No. 201910882938.3, filed with the China National Intellectual Property Administration on Sep. 18, 2019 and entitled "NETWORK HANDOVER METHOD AND TERMINAL DEVICE", each of which are incorporated herein by reference in their entirety.

TECHNICAL FIELD

The present invention relates to the field of wireless communication technologies, and in particular, to a network handover method and a terminal device.

BACKGROUND

With advancement of communication technologies, a 5th generation (5th Generation, 5G) system (for example, a new radio access technology (new radio access technology, NR)) will be a mainstream communication technology in the future. The 5G system at an early stage of commercial use cannot meet a coverage requirement. Therefore, a data link of a terminal device accessing the 5G system has poor link quality. For example, an application running on the terminal device may not receive feedback in a period of time after sending an access request. Consequently, accessing fails.

Currently, when the foregoing problem occurs on a terminal device running the Android (Android) system, the terminal device may recover according to a doRecovery (doRecovery) mechanism (the doRecovery mechanism includes four stages of reestablishment policies, namely, querying an activation list, reconfiguring a route, re-registration, and enabling/disabling an airplane mode) supported by the Android system. However, the doRecovery mechanism cannot resolve poor link quality. Consequently, when a user accesses the Internet by using a 5G terminal device, frame freezing and a slow response may occur.

SUMMARY

This application provides a network handover method and a terminal device. In the method, a terminal device accessing a 5G system can be handed over to another non-5G system in time when data link quality is poor. This ensures data service continuity, and improves terminal performance and user experience.

According to a first aspect, this application provides a network handover method. The method includes: a terminal device first obtains a link quality parameter of a data link of the terminal device; and determines that a 5G system is unavailable when in specified duration, a quantity of downlink data packets received by the terminal device exceeds a first threshold, and a quantity of sent uplink data packets is 0, or in specified duration, a quantity of uplink data packets sent by the terminal device exceeds a second threshold, and a quantity of received downlink data packets is 0, and hands over from the 5G system to a non-5G system.

In embodiments of this application, the terminal device can be handed over to another non-5G system in time when data link quality is poor. This ensures data service continuity, and improves terminal performance and user experience.

In a possible implementation, the terminal device further sends a test data packet to a specified public network server when the link quality parameter meets the specified condition; and determines that the 5G system is unavailable when a probe result of the test data packet indicates that the data link is disconnected, and therefore hands over from the 5G system to the non-5G system.

In a possible implementation, the terminal device parses a historical domain name in a buffer when the link quality parameter meets the specified condition; determines that the 5G system is unavailable when parsing fails; sends a test data packet to a specified public network server when parsing succeeds; and determines that the 5G system is unavailable when a probe result of the test data packet indicates that the data link is disconnected.

In embodiments of this application, the method can accurately determine whether the data link of the terminal device accessing a public network is connected, to determine whether the data link is available.

In a possible implementation, the terminal device parses a historical domain name in a buffer when the link quality parameter meets the specified condition; determines that the 5G system is unavailable when parsing fails; sends a test data packet to a specified public network server when parsing succeeds; and determines that the 5G system is unavailable when a probe result of the test data packet indicates that the data link is disconnected.

In embodiments of this application, a network environment in which the terminal device is located is complex. Therefore, when accessing a private network, the terminal device may determine, by parsing a historical domain name in the foregoing method, whether a data link of the private network is connected. When accessing a public network, the terminal device may also determine, by parsing a historical domain name in the foregoing method, whether a data link of the public network is connected. This avoids an unreliable probe result caused by only sending a test data packet to a specified public network server for link detection.

In a possible implementation, after determining that the 5G system is unavailable, the terminal device may sequentially recover a network by using four stages of reestablishment policies, namely, querying a route, reconfiguring the route, re-registration, and enabling/disabling an airplane mode; and if the network is unsuccessfully recovered, hand over to the non-5G system. In embodiments of this application, the terminal device enables a doRecovery mechanism to recover the network. In some cases, the terminal device can recover the network to a normal state. If the network cannot be recovered, network handover may be performed.

In a possible implementation, after determining that the 5G system is unavailable, the terminal device may recover a network by querying a route; and if the network is unsuccessfully recovered, hand over to the non-5G system. In embodiments of this application, the terminal device recovers the network by querying the route. In some cases, the terminal device can recover the network to a normal state. If the network cannot be recovered, network handover may be performed. In addition, to some extent this can ensure that the terminal device performs network handover in time when data link quality is poor.

In a possible implementation, if the 5G system is NSA, and the terminal device accesses a heterogeneous communication system including the 5G system and an LTE system, when the terminal device is in a connected state, the terminal device sends, to a network device, capability information that the terminal device does not support the 5G system, to trigger the network device to indicate the terminal device to hand over to the LTE system. When the terminal device is in an idle state, the terminal device suppresses reporting of a measurement result of the 5G system, and skips enabling a random access function of the 5G system, so that the terminal device accesses the LTE system in an autonomous network search manner. In embodiments of this application, the method can ensure that the terminal device quickly performs network handover.

In a possible implementation, if the 5G system is NSA, and the terminal device accesses a heterogeneous communication system including the 5G system and another system other than an LTE system and the 5G system, when the terminal device is in a connected state, the terminal device reduces measurement values of measurement reports of a serving cell in an A-type handover event and a B-type handover event, so that the terminal device accesses the non-5G system in an autonomous network search manner, where the serving cell is a cell in the 5G system. When the terminal device is in an idle state, the terminal device reduces a network selection priority of the 5G system, and suppresses reporting of a measurement report of a serving cell in a set period of time, so that the terminal device accesses a non-LTE system in an autonomous network search manner. The non-LTE system does not include the 5G system. In embodiments of this application, the method can ensure that the terminal device quickly performs network handover.

In a possible implementation, if the 5G system is SA, the terminal device may send, to a network device, capability information that the terminal device does not support the 5G system, to trigger the network device to indicate the terminal device to hand over to the non-5G system. In embodiments of this application, the method can ensure that the terminal device quickly performs network handover.

According to a second aspect, this application provides a network handover method. The method includes: a terminal device obtains a link quality parameter of a data link of the terminal device, where the terminal device currently accesses a 5G system; and determines that the 5G system is unavailable when the link quality parameter meets a specified condition, and hands over to a non-5G system. The link quality parameter includes at least one of a quantity of uplink data packets and a quantity of downlink data packets that are received in specified duration, a packet loss rate, and a buffer latency of an uplink data packet, and the specified condition is at least one of the following six specified conditions:

a first specified condition: In the specified duration, a quantity of downlink data packets received by the terminal device exceeds a first threshold, and a quantity of sent uplink data packets is 0;

a second specified condition: In the specified duration, a quantity of uplink data packets sent by the terminal device exceeds a second threshold, and a quantity of received downlink data packets is 0;

a third specified condition: In the specified duration, a quantity of downlink data packets received by the terminal device is not 0, and a ratio between a quantity of sent uplink data packets and a quantity of received downlink data packets is greater than a first specified ratio;

a fourth specified condition: In the specified duration, a quantity of uplink data packets sent by the terminal device is not 0, and a ratio between a quantity of sent uplink data packets and a quantity of received downlink data packets is less than a second specified ratio;

a fifth specified condition: In the specified duration, a buffer latency of an uplink data packet of the terminal device exceeds the specified duration; and a sixth specified condition: In the specified duration, a packet loss rate of the terminal device is greater than a third threshold.

In embodiments of this application, the terminal device determines whether the 5G system is available based on various types of data link quality parameters such as the packet loss rate, the buffer latency of the uplink data packet, the quantity of uplink data packets, and the quantity of downlink data packets. This helps improve accuracy of a determining result, covers a plurality of scenarios, and is very practical.

In a possible implementation, the terminal device further sends a test data packet to a specified public network server when the link quality parameter meets the specified condition; and determines that the 5G system is unavailable when a probe result of the test data packet indicates that the data link is disconnected, and therefore hands over from the 5G system to the non-5G system.

In a possible implementation, the terminal device parses a historical domain name in a buffer when the link quality parameter meets the specified condition; determines that the 5G system is unavailable when parsing fails; sends a test data packet to a specified public network server when parsing succeeds; and determines that the 5G system is unavailable when a probe result of the test data packet indicates that the data link is disconnected.

In embodiments of this application, the method can accurately determine whether the data link of the terminal device accessing a public network is connected, to determine whether the data link is available.

In a possible implementation, the terminal device parses a historical domain name in a buffer when the link quality parameter meets the specified condition; determines that the 5G system is unavailable when parsing fails; sends a test data packet to a specified public network server when parsing succeeds; and determines that the 5G system is unavailable when a probe result of the test data packet indicates that the data link is disconnected.

In embodiments of this application, a network environment in which the terminal device is located is complex. Therefore, when accessing a private network, the terminal device may determine, by parsing a historical domain name in the foregoing method, whether a data link of the private network is connected. When accessing a public network, the terminal device may also determine, by parsing a historical domain name in the foregoing method, whether a data link of the public network is connected. This avoids an unreliable probe result caused by only sending a test data packet to a specified public network server for link detection.

In a possible implementation, after determining that the 5G system is unavailable, the terminal device may sequentially recover a network by using four stages of reestablishment policies, namely, querying a route, reconfiguring the route, re-registration, and enabling/disabling an airplane mode; and if the network is unsuccessfully recovered, hand over to the non-5G system. In embodiments of this application, the terminal device enables a doRecovery mechanism to recover the network. In some cases, the terminal device can recover the network to a normal state. If the network cannot be recovered, network handover may be performed.

In a possible implementation, after determining that the 5G system is unavailable, the terminal device may recover a network by querying a route; and if the network is unsuccessfully recovered, hand over to the non-5G system. In embodiments of this application, the terminal device recovers the network by querying the route. In some cases, the terminal device can recover the network to a normal state. If the network cannot be recovered, network handover may be performed. In addition, to some extent this can ensure that the terminal device performs network handover in time when data link quality is poor.

In a possible implementation, if the 5G system is NSA, and the terminal device accesses a heterogeneous communication system including the 5G system and an LTE system, when the terminal device is in a connected state, the terminal device sends, to a network device, capability information that the terminal device does not support the 5G system, to trigger the network device to indicate the terminal device to hand over to the LTE system. When the terminal device is in an idle state, the terminal device suppresses reporting of a measurement result of the 5G system, and skips enabling a random access function of the 5G system, so that the terminal device accesses the LTE system in an autonomous network search manner. In embodiments of this application, the method can ensure that the terminal device quickly performs network handover.

In a possible implementation, if the 5G system is NSA, and the terminal device accesses a heterogeneous communication system including the 5G system and another system other than an LTE system and the 5G system, when the terminal device is in a connected state, the terminal device reduces measurement values of measurement reports of a serving cell in an A-type handover event and a B-type handover event, so that the terminal device accesses the non-5G system in an autonomous network search manner, where the serving cell is a cell in the 5G system. When the terminal device is in an idle state, the terminal device reduces a network selection priority of the 5G system, and suppresses reporting of a measurement report of a serving cell in a set period of time, so that the terminal device accesses a non-LTE system in an autonomous network search manner. The non-LTE system does not include the 5G system. In embodiments of this application, the method can ensure that the terminal device quickly performs network handover.

In a possible implementation, if the 5G system is SA, the terminal device may send, to a network device, capability information that the terminal device does not support the 5G system, to trigger the network device to indicate the terminal device to hand over to the non-5G system. In embodiments of this application, the method can ensure that the terminal device quickly performs network handover.

According to a third aspect, an embodiment of this application further provides a terminal device. The terminal device includes a display, one or more processors, a memory, and one or more programs. The one or more programs are stored in the memory, the one or more programs include instructions, and when the instructions are executed by the terminal device, the terminal device is enabled to perform method steps in the first aspect.

According to a fourth aspect, an embodiment of this application further provides a terminal device. The terminal device may include modules/units that perform the method in any one of the first aspect or the possible designs of the first aspect. The modules/units may be implemented by hardware, or may be implemented by hardware executing corresponding software.

According to a fifth aspect, an embodiment of this application further provides a computer storage medium. The computer storage medium stores computer-executable instructions, and when the computer-executable instructions are invoked by a computer, the computer is enabled to perform the method in any one of the first aspect or the possible designs of the first aspect or the method in any one of the second aspect or the possible designs of the second aspect.

According to a sixth aspect, an embodiment of this application further provides a computer program product. The computer program product stores instructions, and when the instructions are run on a computer, the computer is enabled to perform the method in any one of the first aspect or the possible designs of the first aspect or the method in any one of the second aspect or the possible designs of the second aspect.

According to a seventh aspect, an embodiment of this application further provides a chip. The chip is coupled to a memory and is configured to read and execute program instructions stored in the memory, to implement the method in the first aspect or the second aspect.

DETAILED DESCRIPTION OF ILLUSTRATIVE EMBODIMENTS

To make objectives, technical solutions, and advantages of embodiments of this application clearer, the following describes the technical solutions in embodiments of this application in detail with reference to the accompanying drawings of the specification and specific implementations, In the following, some terms of embodiments of this application are described, to help a person skilled in the art have a better understanding.

(1) An application in embodiments of this application is referred to as an App for short, and is a software program that can implement one or more specific functions. Usually, a plurality of applications may be installed on a terminal device, for example, camera, video, and game. The application mentioned in the following may be a system application installed on a terminal device before delivery, or may be a third-party application downloaded from the Internet or obtained from another terminal device by a user when using a terminal device.

(2) A doRecovery (doRecovery) mechanism is natively supported by the Android operating system. Currently, four stages of recovery are supported: querying an activation list, reconfiguring the route, re-registration, and enabling/disabling an airplane mode. When no data is fed back to uplink data packets sent by all applications running on a terminal device (for example, a mobile phone), the terminal device enables the doRecovery mechanism. For example, stage 1: Query an activation list. Stage 2: If no data is fed back, reconfigure a route. Stage 3: If no data is fed back, perform re-registration. Stage 4: If no data is fed back, enable an airplane mode and then disable the airplane mode.

(3) Single passthrough means that a network interface card of a terminal device is in a single-passthrough state, that is, there is an uplink data packet but no downlink data packet, or there is a downlink data packet but no uplink data packet.

Figure 1A:
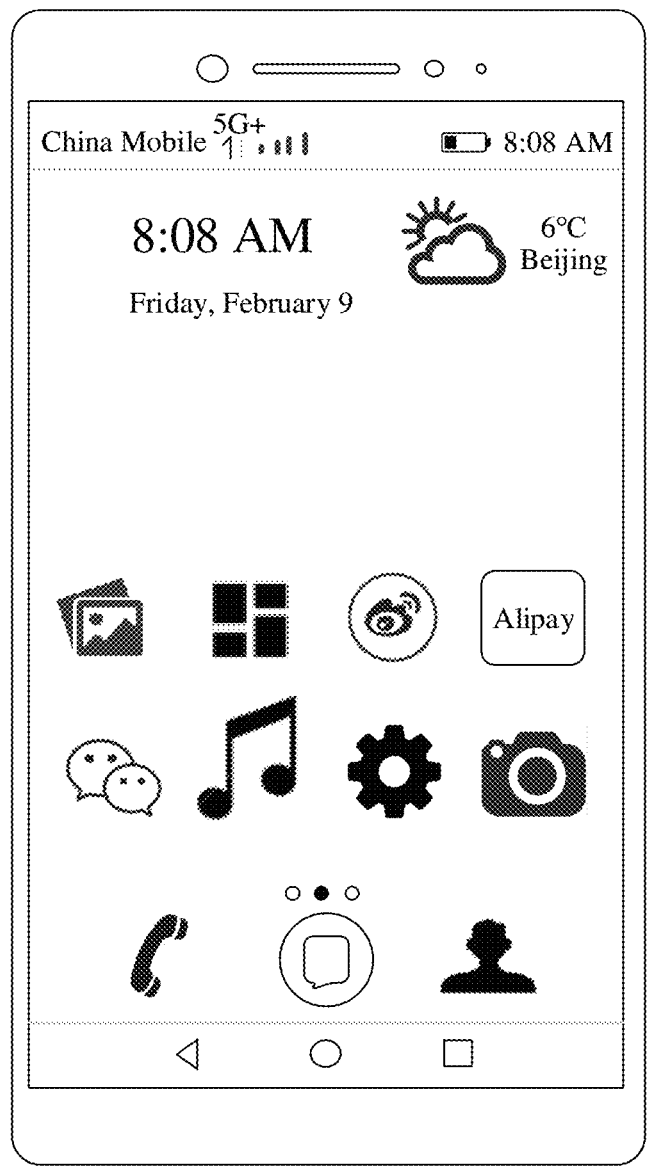
FIG. 1(a), FIG. 1(b), FIG. 1(c), and FIG. 1(d) are schematic diagrams of a group of interfaces in the conventional technology.
Figure 1B:
Figure 1C:
Figure 1D:

In the conventional technology, when encountering a problem that a network is unavailable, a terminal device accessing a 5G system enables the doRecovery (doRecovery) mechanism (including four stages of reestablishment policies, namely, querying an activation list, reconfiguring a route, re-registration, and enabling/disabling an airplane mode) supported by the Android system for recovery. For example, when an application currently running on the terminal device does not receive feedback in a period of time after sending an access request, the terminal device enables the doRecovery mechanism supported by the Android system for recovery. For example, as shown in FIG. 1(a), a network signal icon in a status bar indicates that currently there is only uplink transmission but no downlink transmission. When the transmission status remains unchanged in a period of time (for example, 20 seconds), a mobile phone enables the doRecovery mechanism. In this case, the network signal icon of the mobile phone may be that as shown in FIG. 1(b), and is used to indicate that currently there is no uplink transmission and no downlink transmission. Then, the status bar of the mobile phone may be that as shown in FIG. 1(c), that is, four bars of signal strength all disappear. Then, the mobile phone may fail to find a network at all. The status bar is that as shown in FIG. 1(d). Finally, the mobile phone accesses the 5G system again. After the mobile phone accesses the 5G system again, a network status may still be that as shown in FIG. 1(a), that is, there is only uplink transmission but no downlink transmission. In other words, after the mobile phone performs the foregoing recovery processing according to the doRecovery mechanism, poor link quality may still not be resolved. In addition, because the mobile phone cannot find a network for a period of time, the mobile phone cannot find a signal in the period of time, a user may miss a call, and user experience is affected.

In view of this, embodiments of this application provide a network handover method. In this method, a terminal device accessing a 5G system can be handed over to another non-5G system in time when link quality of a data link is poor. This ensures data service continuity, and improves terminal performance and user experience.

The network handover method in embodiments of this application may be applied to various communication systems, for example, a long term evolution (long term evolution, LTE) system, a worldwide interoperability for microwave access (worldwide interoperability for microwave access, WiMAX) communication system, a 5th generation (5th Generation, 5G) system such as a new radio access technology (new radio access technology, NR), and a future communication system such as a 6G system.

In addition, the term "for example" in embodiments of this application is used to represent giving an example, an illustration, or description. Any embodiment or design scheme described as an "example" in this application should not be explained as being more preferred or having more advantages than another embodiment or design scheme. Exactly, the term "example" is used to present a concept in a specific manner.

A network architecture and a service scenario described in embodiments of this application are intended to describe the technical solutions in embodiments of this application more clearly, and do not constitute a limitation on the technical solutions provided in embodiments of this application. A person of ordinary skill in the art may know that with evolution of the network architecture and emergence of a new service scenario, the technical solutions provided in embodiments of this application are also applicable to similar technical problems.

Embodiments of this application may be applied to a conventional typical network or a future UE-centric (UE-centric) network. A non-cell (Non-cell) network architecture is introduced to the UE-centric network. To be specific, a plurality of small cells are deployed in a specific area, to form a hyper cell (Hyper cell), and each small cell is a transmission point (Transmission Point, TP) or a TRP of the hyper cell, and is connected to a centralized controller. When the UE moves in the hyper cell, a network side device selects a new sub-cluster (sub-cluster) for the UE in real time to serve the UE, to avoid real cell handover, and implement UE service continuity. The network side device includes a wireless network device.

Some scenarios in embodiments of this application are described by using an NR system as an example. It should be noted that the solutions in embodiments of this application may further be applied to another wireless communication network, and a corresponding name may be replaced with a name of a corresponding function in the another wireless communication network.

Figure 2:
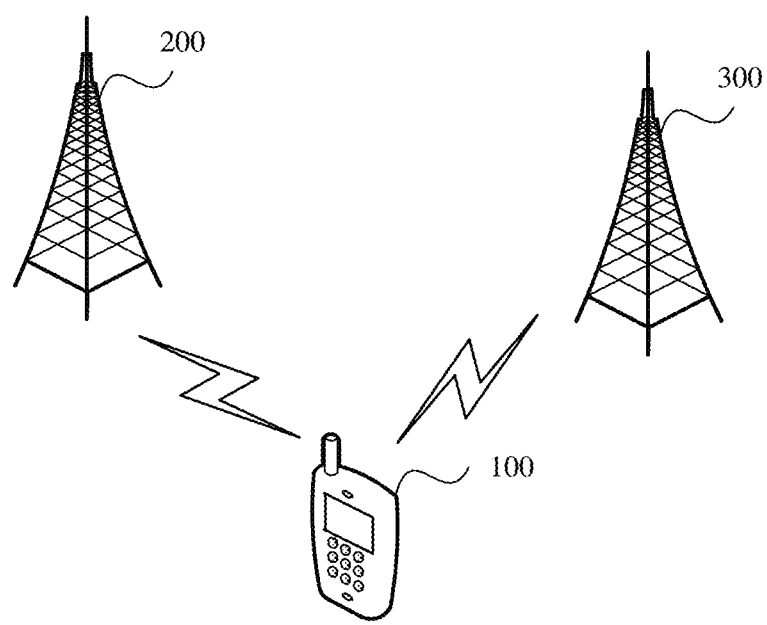
FIG. 2 is a schematic diagram of a scenario architecture of a communication system applicable to an embodiment of this application.

To better understand embodiments of this application, the following describes in detail a communication system applicable to embodiments of this application by using a communication system shown in FIG. 2 as an example. FIG. 2 is a schematic diagram of a communication system applicable to a communication method according to an embodiment of this application. As shown in FIG. 2, the communication system includes a network device 200 and a terminal device 100. A plurality of antennas may be configured for the network device 200, and a plurality of antennas may also be configured for the terminal device. Optionally, the communication system may further include a network device 300, and a plurality of antennas may also be configured for the network device 300.

It should be understood that the network device 200 or the network device 300 may further include a plurality of components (for example, a processor, a modulator, a multiplexer, a demodulator, or a demultiplexer) related to signal sending and signal receiving.

The network device is a device with a wireless transceiver function or a chip that may be disposed in the device. The device includes but is not limited to an evolved NodeB (evolved NodeB, eNB), a radio network controller (radio network controller, RNC), a NodeB (NodeB, NB), a base station controller (base station controller, BSC), a base transceiver station (base transceiver station, BTS), a home NodeB (for example, a home evolved NodeB, or a home NodeB, HNB), a baseband unit (baseband unit, BBU), an access point (access point, AP), a wireless relay node, a wireless backhaul node, and a transmission point (transmission and reception point, TRP or transmission point, TP) in a wireless fidelity (wireless fidelity, Wi-Fi) system, a gNB in a 5G (for example, NR) system, a transmission point (TRP or TP), one antenna panel or a group of antenna panels (including a plurality of antenna panels) of a base station in a 5G system, or a network node that forms a gNB or a transmission point, for example, a baseband unit (BBU) or a distributed unit (distributed unit, DU).

In some deployments, the gNB may include a centralized unit (centralized unit, CU) and a DU. The gNB may further include a radio unit (radio unit, RU). The CU implements a part of functions of the gNB, and the DU implements a part of functions of the gNB. For example, the CU implements functions of a radio resource control (radio resource control, RRC) layer and a packet data convergence protocol (packet data convergence protocol, PDCP) layer, and the DU implements functions of a radio link control (radio link control, RLC) layer, a media access control (media access control, MAC) layer, and a physical (physical, PHY) layer. Information at the RRC layer finally becomes information at the PHY layer or is transformed from information at the PHY layer. Therefore, in such an architecture, it may be considered that higher layer signaling such as RRC layer signaling or PHCP layer signaling is sent by the DU or is sent by the DU and the RU. It may be understood that the network device may be a CU node, a DU node, or a device including a CU node and a DU node. In addition, the CU may be classified as a network device in a radio access network RAN, or the CU may be classified as a network device in a core network CN. This is not limited herein.

The terminal device may also be referred to as user equipment (user equipment, UE), an access terminal, a subscriber unit, a subscriber station, a mobile station, a mobile console, a remote station, a remote terminal, a mobile device, a user terminal, a terminal, a wireless communications device, a user agent, or a user apparatus. In embodiments of this application, the terminal device may be a mobile phone (mobile phone), a tablet computer (Pad), an intelligent printer, a train detector, a gas station detector, a computer having a wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in embodiments of this application. In this application, the foregoing terminal device and a chip that may be disposed in the terminal device are collectively referred to as a terminal device.

Both the network device 200 and the network device 300 may communicate with a plurality of terminal devices (for example, the terminal device 100 shown in FIG. 2). Both the network device 200 and the network device 300 may communicate with any quantity of terminal devices similar to the terminal device 100. However, it should be understood that the terminal device communicating with the network device 200 and the terminal device communicating with the network device 300 may be the same, or may be different. The terminal device 100 shown in FIG. 2 may simultaneously communicate with the network device 200 and the network device 300. However, FIG. 2 shows only one possible scenario. In some scenarios, the terminal device may communicate only with the network device 200 or the network device 300. This is not limited in this application.

It should be understood that FIG. 2 is merely a simplified schematic diagram of an example for ease of understanding. The communication system may further include another network device or another terminal device. This is not shown in FIG. 2.

Figure 3:
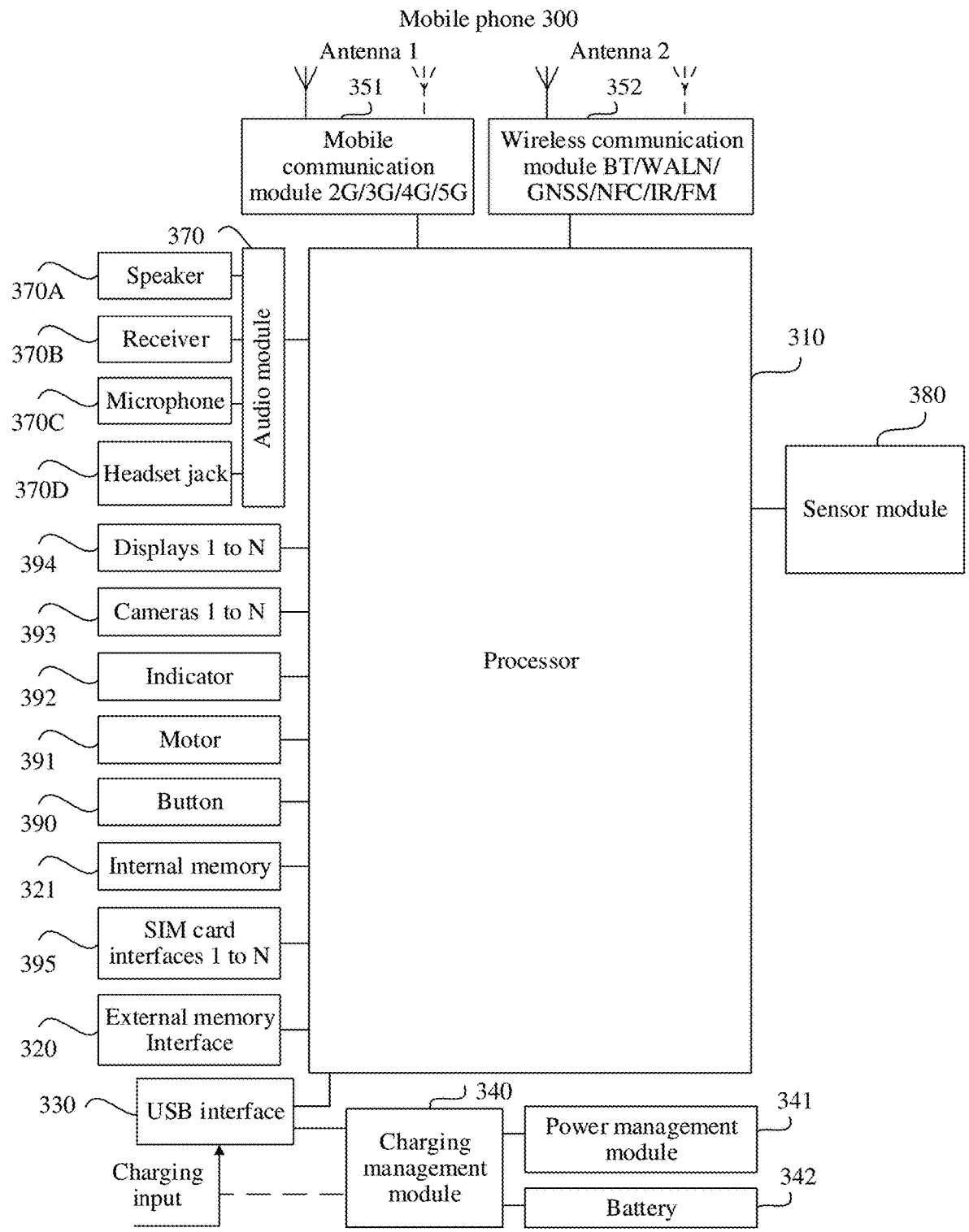
FIG. 3 is a schematic diagram of a structure of a mobile phone according to an embodiment of this application.

For example, the terminal device 100 is a mobile phone. FIG. 3 is a schematic diagram of a structure of a mobile phone 300.

The mobile phone 300 may include a processor 310, an external memory interface 320, an internal memory 321, a USB interface 330, a charging management module 340, a power management module 341, a battery 342, an antenna 1, an antenna 2, a mobile communication module 351, a wireless communication module 352, an audio module 370, a speaker 370A, a receiver 370B, a microphone 370C, a headset jack 370D, a sensor module 380, a button 390, a motor 391, an indicator 392, a camera 393, a display 394, a SIM card interface 395, and the like. The sensor module 380 may include a gyroscope sensor, an acceleration sensor, an optical proximity sensor, a fingerprint sensor, and a touch sensor. The mobile phone 300 may further include another sensor, for example, a temperature sensor, a pressure sensor, a distance sensor, a magnetic sensor, an ambient light sensor, a barometric pressure sensor, or a bone conduction sensor, which is not shown in the figure.

It may be understood that the structure shown in this embodiment of the present invention does not constitute a specific limitation on the mobile phone 300. In some other embodiments of this application, the mobile phone 300 may include more or fewer components than components shown in the figure, or some components may be combined, or some components may be split, or there may be a different component arrangement. The components shown in the figure may be implemented in hardware, software, or a combination of software and hardware.

The processor 310 may include one or more processing units. For example, the processor 310 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural network processing unit (Neural network Processing Unit, NPU). Different processing units may be independent components, or may be integrated into one or more processors. The controller may be a nerve center and a command center of the mobile phone 300. The controller may generate an operation control signal based on instruction operation code and a time sequence signal, to complete control of instruction reading and instruction execution.

A memory may further be disposed in the processor 310, and is configured to store instructions and data. In some embodiments, the memory in the processor 310 is a cache memory. The memory may store instructions or data that has just been used or has been repeatedly used by the processor 310. If the processor 310 needs to reuse the instructions or the data, the processor 310 may directly invoke the instructions or the data from the memory. This avoids repeated access and reduces waiting time of the processor 310, thereby improving system efficiency.

The processor 310 may run the network handover method in embodiments of this application, to simplify a control operation performed by a user on a smart home device, and improve user experience. When the processor 310 may include different components, for example, integrating a CPU and a GPU, the CPU and the GPU may cooperate to perform the network handover method in embodiments of this application. For example, in the network handover method, some algorithms are executed by the CPU, and other algorithms are executed by the GPU, to achieve fast processing efficiency.

The display 394 is configured to display an image, a video, and the like. The display 394 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini LED, a micro LED, a micro OLED, a quantum dot light emitting diode (quantum dot light emitting diode, QLED), or the like. In some embodiments, the mobile phone 300 may include one or N displays 394, where N is a positive integer greater than 1.

In this embodiment of this application, the display 394 may be an integrated flexible display, or may be a spliced display including two rigid displays and one flexible display between the two rigid displays. After running the network handover method in embodiments of this application, the processor 310 may control window sizes of different interfaces of a same application on the display 394.

The camera 393 (which may be a front-facing camera or a rear-facing camera, or one camera may serve as either a front-facing camera or a rear-facing camera) is used to capture a static image or video. Usually, the camera 393 may include photosensitive elements such as a lens assembly and an image sensor. The lens assembly includes a plurality of lenses (a convex lens or a concave lens), and is configured to collect an optical signal reflected by a to-be-photographed object, and transfer the collected optical signal to the image sensor. The image sensor generates an original image of the to-be-photographed object based on the optical signal.

The internal memory 321 may be configured to store computer-executable program code, where the executable program code includes instructions. The processor 310 executes various functional applications and data processing of the mobile phone 300 by running instructions stored in the internal memory 321. The internal memory 321 may include a program storage region and a data storage region. The program storage area may store code of an operating system, an application (for example, a camera application or a WeChat application), and the like. The data storage region may store data (for example, an image or video collected by the camera application) created in a process of using the mobile phone 300, and the like.

The internal memory 321 may further store code of a display region adjustment algorithm in this embodiment of this application. When the code of the display region adjustment algorithm stored in the internal memory 321 is run by the processor 310, the processor 310 may control a display position of a message in a notification bar on the display 394.

In addition, the internal memory 321 may include a high-speed random access memory, and may further include a nonvolatile memory, for example, at least one magnetic disk storage device, a flash memory device, or a universal flash storage (universal flash storage, UFS).

Code of a display region adjustment algorithm in this embodiment of this application may alternatively be stored in an external memory. In this case, the processor 310 may run, through the external memory interface 320, the code of the display region adjustment algorithm stored in the external memory, to control window sizes of different interfaces of a same application on the display 394.

A wireless communication function of the mobile phone 300 may be implemented by using the antenna 1, the antenna 2, the mobile communication module 351, the wireless communication module 352, the modem processor, the baseband processor, and the like.

The antenna 1 and the antenna 2 are configured to transmit and receive electromagnetic wave signals. Each antenna in the mobile phone 300 may be configured to cover one or more communication frequency bands. Different antennas may further be multiplexed, to improve antenna utilization. For example, the antenna 1 may be multiplexed as a diversity antenna in a wireless local area network. In some other embodiments, an antenna may be used in combination with a tuning switch.

The mobile communication module 351 may provide a solution, applied to the mobile phone 300, for wireless communication including 2G/3G/4G/5G. The mobile communication module 351 may include at least one filter, a switch, a power amplifier, a low noise amplifier (low noise amplifier, LNA), and the like. The mobile communication module 351 may receive an electromagnetic wave signal by using the antenna 1, perform processing such as filtering and amplification on the received electromagnetic wave signal, and transmit a processed electromagnetic wave signal to the modem processor for demodulation. The mobile communication module 351 may further amplify a signal modulated by the modem processor, and convert an amplified signal into an electromagnetic wave by using the antenna 1 for radiation. In some embodiments, at least some functional modules of the mobile communication module 351 may be disposed in the processor 310. In some embodiments, at least some functional modules of the mobile communication module 351 and at least some modules of the processor 310 may be disposed in a same component.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then a processed low-frequency baseband signal is transferred to the application processor. The application processor outputs a sound signal through an audio device (which is not limited to the speaker 370A, the receiver 370B, or the like), or displays an image or video through the display 394. In some embodiments, the modem processor may be an independent component. In some other embodiments, the modem processor may be independent of the processor 310, and disposed in a same component as the mobile communication module 351 or another functional module.

The wireless communication module 352 may provide a solution, applied to the mobile phone 300, for wireless communication such as a wireless local area network (wireless local area network, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, and an infrared (infrared, IR) technology. The wireless communication module 352 may be one or more components integrating at least one communication processing module. The wireless communication module 352 receives an electromagnetic wave signal by using the antenna 2, modulates and performs filtering processing on the electromagnetic wave signal, and sends a processed signal to the processor 310. The wireless communication module 352 may further receive a to-be-sent signal from the processor 310, modulate and amplify the received signal, and convert a signal into an electromagnetic wave by using the antenna 2 for radiation.

In addition, the mobile phone 300 may implement an audio function, for example, playing music or recording, by using the audio module 370, the speaker 370A, the receiver 370B, the microphone 370C, the headset jack 370D, the application processor, and the like. The mobile phone 300 may receive an input from the button 390, and generate a button signal input related to user setting and function control of the mobile phone 300. The mobile phone 300 may generate a vibration prompt (for example, an incoming call vibration prompt) by using the motor 391. The indicator 392 in the mobile phone 300 may be indicator light, and may be configured to indicate a charging status, a power change, or may be configured to indicate a message, a missed call, a notification, and the like. The SIM card interface 395 in the mobile phone 300 is configured to connect to a SIM card. The SIM card may be inserted into the SIM card interface 395 or removed from the SIM card interface 395, to implement contact with and separation from the mobile phone 300.

It should be understood that, during actual application, the mobile phone 300 may include more or fewer components than components shown in FIG. 3. This is not limited in this embodiment of this application.

A terminal device accessing a 5G system cannot normally perform a data service by using a 5G network when data link quality is poor. Therefore, this application provides a network handover method, and this method may be applied to various terminal devices such as a mobile phone, a notebook computer, or a tablet computer. This method includes: when a link quality parameter of a data link of a terminal device meets a specified condition, determining that a 5G system currently accessed by the terminal device is unavailable, and handing over from the 5G system to a non-5G system. This can ensure continuity of a data service of the terminal device, to avoid occurrence of frame freezing, a slow response, or the like on the terminal device, and improve user experience.

Figure 4A:
FIG. 4(a) and FIG. 4(b) are schematic diagrams of a group of interfaces according to an embodiment of this application.
Figure 4B:
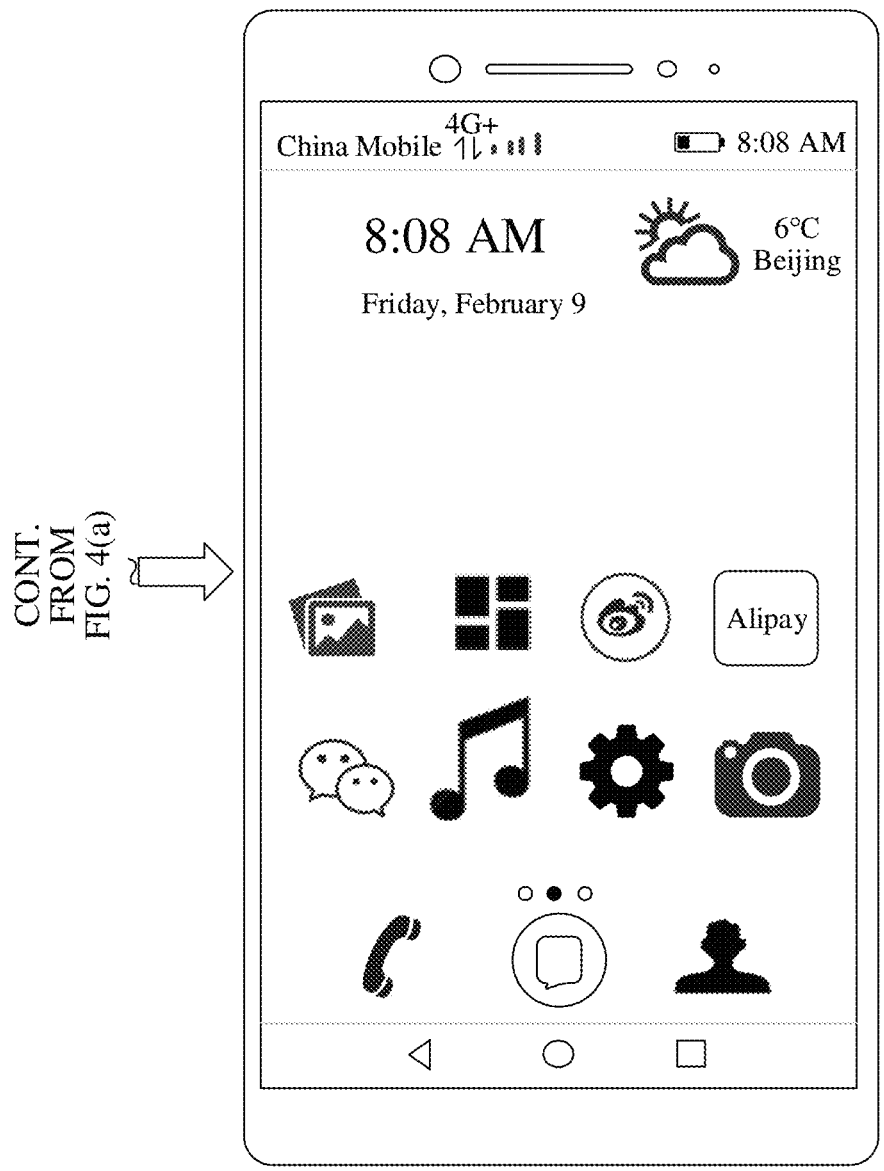

For example, when a serving cell in which a mobile phone is currently located is not covered by a 5G network, or a network fault occurs in a 5G network, the mobile phone cannot use the 5G network to perform a data service, and frame freezing, a slow response, or no response may occur on the mobile phone. In a scenario shown in FIG. 4(a), a network signal icon in a status bar of the mobile phone indicates that currently there is only uplink transmission but no downlink transmission. In this embodiment of this application, in this case, the mobile phone may obtain a link quality parameter in the current scenario in real time, for example, a packet loss rate, a buffer latency of an uplink data packet, or a quantity of uplink data packets and a quantity of downlink data packets received in specified duration; determine whether the link quality parameter meets a specified condition; and if the link quality parameter meets the specified condition, hand over from a 5G system to an LTE system, to ensure data service continuity. For example, after the mobile phone performs network handover, the network signal icon in the status bar of the mobile phone shows that the mobile phone hands over to a 4G network, as shown in FIG. 4(b).

The following specifically describes the foregoing network handover method with reference to various link quality parameters and various cases in which the link quality parameter meets the specified condition. It should be noted that six cases listed below in this embodiment of this application do not constitute a limitation on this solution. The terminal device may alternatively perform network handover when the link quality parameter meets another condition.

Case 1: The link quality parameter is a quantity of downlink data packets and a quantity of uplink data packets, and a first specified condition is: In the specified duration, a quantity of downlink data packets received by the terminal device exceeds a first threshold, and a quantity of sent uplink data packets is 0.

The network handover method may be understood as: When the quantity of uplink data packets and the quantity of downlink data packets meet the first specified condition, the terminal device determines that a 5G system currently accessed by the terminal device is unavailable, and hands over from the 5G system to a non-5G system.

Case 2: The link quality parameter is a quantity of downlink data packets and a quantity of uplink data packets, and a second specified condition is: In the specified duration, a quantity of uplink data packets sent by the terminal device exceeds a second threshold, and a quantity of received downlink data packets is 0.

The network handover method may be understood as: When the quantity of uplink data packets and the quantity of downlink data packets meet the second specified condition, the terminal device determines that a 5G system currently accessed by the terminal device is unavailable, and hands over from the 5G system to a non-5G system.

In other words, Case 1 and Case 2 mean that the terminal device detects that a network interface card is in a single-passthrough state, that is, there is an uplink data packet but no downlink data packet, or there is a downlink data packet but no uplink data packet. Therefore, the terminal device determines that the currently accessed 5G system is unavailable, and then performs network handover.

Case 3: The link quality parameter is a quantity of downlink data packets and a quantity of uplink data packets, and a third specified condition is: In the specified duration, a quantity of downlink data packets received by the terminal device is not 0, and a ratio between a quantity of sent uplink data packets and a quantity of received downlink data packets is greater than a first specified ratio. For example, the first specified threshold is 3:1, and the ratio between the quantity of uplink data packets sent by the terminal device and the quantity of received downlink data packets in the specified duration is 10:1.

The network handover method may be understood as: When the quantity of uplink data packets and the quantity of downlink data packets meet the third specified condition, the terminal device determines that a 5G system currently accessed by the terminal device is unavailable, and hands over from the 5G system to a non-5G system.

Case 4: The link quality parameter is a quantity of downlink data packets and a quantity of uplink data packets, and a fourth specified condition is: In the specified duration, a quantity of uplink data packets sent by the terminal device is not 0, and a ratio between a quantity of sent uplink data packets and a quantity of received downlink data packets is less than a second specified ratio. For example, the second specified ratio is 1:1, and the ratio between the quantity of uplink data packets sent by the terminal device and the quantity of received downlink data packets in the specified duration is 1:10.

The network handover method may be understood as: When the quantity of uplink data packets and the quantity of downlink data packets meet the fourth specified condition, the terminal device determines that a 5G system currently accessed by the terminal device is unavailable, and hands over from the 5G system to a non-5G system.

In other words, Case 3 and Case 4 mean that the terminal device detects that a network interface card is not in a single-passthrough state, but a quantity of downlink data packets is much greater than a quantity of uplink data packets, or a quantity of uplink data packets is much greater than a quantity of downlink data packets. It indicates that a network fault occurs on a 5G system, and the terminal device cannot normally receive and send data. Therefore, the terminal device determines that the currently accessed 5G system is unavailable, and hands over from the 5G system to a non-5G system.

Case 5: The link quality parameter is a buffer latency of an uplink data packet, and a fifth specified condition is: In the specified duration, the buffer latency of the uplink data packet of the terminal device exceeds the specified duration.

The network handover method may be understood as: When the buffer latency of the uplink data packet meets the fifth specified condition, the terminal device determines that a 5G system currently accessed by the terminal device is unavailable, and hands over from the 5G system to a non-5G system.

It should be noted that in Case 5, specific values of the specified duration are different in different scenarios. For example, the specific values are shown in Table 1.

determines that the 5G system is unavailable, and performs network handover. If the user is currently playing a real-time battle game, when a latency of an uplink data packet of the terminal device exceeds 20 seconds, the terminal device determines that the 5G system is unavailable, and performs network handover. If the user is currently sending a message by using an instant messaging application, when a latency of an uplink data packet of the terminal device exceeds 20 seconds, the terminal device determines that the 5G system is unavailable, and performs network handover. It should be noted that a specific value of the specified duration may be adjusted based on an actual requirement. This is not limited in this embodiment of this application.

Case 6: The link quality parameter is a packet loss rate, and a sixth specified condition is: In the specified duration, the packet loss rate of the terminal device is greater than a third threshold.

The network handover method may be understood as: When the packet loss rate meets the sixth specified condition, the terminal device determines that a 5G system currently accessed by the terminal device is unavailable, and hands over from the 5G system to a non-5G system.

For example, if the user is playing a real-time battle game, the packet loss rate is greater than the specified threshold, the user repeatedly sends battle instructions but fails to receive a response, and consequently the mobile phone determines that the currently accessed 5G system is unavailable, and performs network handover.

It should be noted that, in the network handover method in embodiments of this application, in a possible implementation, the terminal device performs network handover when the link quality parameter of the terminal device meets any one of the foregoing specified conditions. In another possible implementation, the terminal device performs network handover only when the link quality parameter of the terminal device meets at least two of the foregoing specified conditions. For example, when the packet loss rate of the terminal device is greater than the third threshold, and the buffer latency of the uplink data packet of the terminal device exceeds the specified duration, the terminal device determines that the 5G system is unavailable, and performs network handover.

In another possible embodiment, when determining that the link quality parameter meets at least one of the foregoing specified conditions, the terminal device may further determine whether the terminal device meets at least one of the following cases 1.1 to 1.5. If the terminal device meets at least one of the following cases 1.1 to 1.5, the terminal device performs network handover.

TABLE 1

| Scenario | Specified duration | State of a terminal device |
| --- | --- | --- |
| Graphic web page | 30 seconds | Prompt that refreshing is in process |
| Video on demand | 60 seconds | A buffer is full, and playing stops |
| Real-time battle game | 20 seconds | Automatic exit |
| Instant messaging | 20 seconds | Automatic stop |

It can be learned from Table 1 that, if a user is currently browsing a web page, when a latency of an uplink data packet of the terminal device exceeds 30 seconds, the terminal device determines that the 5G system is unavailable, and performs network handover. If the user is currently watching video, when a latency of an uplink data packet of the terminal device exceeds 60 seconds, the terminal device Case 1.1: When a buffer of the terminal device does not store a historical domain name, a probe result of a test data packet sent by the terminal device to a specified public network server indicates that the data link is disconnected.

When the terminal device meets Case 1.1, the network handover method may be understood as: When the link quality parameter of the terminal device meets at least one of the foregoing six specified conditions, because the buffer of the terminal device does not store a historical domain name, the terminal device actively sends the test data packet (for example, a ping data packet) to the specified public network server. If the probe result of the test data packet indicates that the data link is disconnected, the terminal device determines that the 5G system is unavailable, and therefore performs network handover.

It should be noted that a domain name system (Domain Name System, DNS) is a service of the Internet. The domain name system is a distributed database that maps a domain name and an IP address to each other, so that a user can easily access the Internet. After a user accesses a network by using a terminal device, information about an accessed historical domain name is stored in a buffer of the terminal device. If the terminal device is a newly delivered device or has been restored to factory settings, the buffer of the terminal device may not store information about a historical domain name. Therefore, the terminal device may send a test data packet, for example, a ping data packet, to a specified public network server, to detect the network.

Case 1.2: When a buffer of the terminal device stores a historical domain name, the terminal device unsuccessfully parses the historical domain name, and a probe result of a test data packet sent by the terminal device to a specified public network server indicates that the data link is disconnected.

When the terminal device meets Case 1.2, the network handover method may be understood as: When the link quality parameter of the terminal device meets at least one of the foregoing six specified conditions, because the buffer of the terminal device stores the historical domain name, the terminal device parses the historical domain name (the historical domain name may be a domain name closest to current time). If parsing fails, it indicates that the terminal device currently cannot access a network. Because it is uncertain whether the historical domain name corresponds to a private network (for example, a private railway network, a private public security network, a private flood control network, or a private military network), if the historical domain name corresponds to a private network, unsuccessful parsing only indicates that the terminal device currently cannot access the private network. Therefore, the terminal device further sends the test data packet to the specified public network server. If the probe result indicates that the network is connected, it indicates that the 5G system is available. If the probe result indicates that the data link is disconnected, it indicates that the 5G system is unavailable.

Case 1.3: When a buffer of the terminal device stores a historical domain name, the terminal device successfully parses the historical domain name, but a probe result of a test data packet sent by the terminal device to a specified public network server indicates that the data link is disconnected.

When the terminal device meets Case 1.3, the network handover method may be understood as: When the link quality parameter of the terminal device meets at least one of the foregoing six specified conditions, because the buffer of the terminal device stores the historical domain name, the terminal device parses the historical domain name. If parsing succeeds, it indicates that the terminal device can access a network. Because it is uncertain whether the historical domain name corresponds to a private network, if the historical domain name corresponds to a private network, successful parsing only indicates that the terminal device currently can access the private network. Therefore, the terminal device further sends the test data packet to the specified public network server. If the probe result indicates that the network is connected, it indicates that the 5G system is available. If the probe result indicates that the data link is disconnected, it indicates that the 5G system is unavailable.

Case 1.4: After the terminal device performs cell handover, a link quality parameter of the data link of the terminal device still does not meet the specified condition.

When the terminal device meets Case 1.4, the network handover method may be understood as: When the link quality parameter of the terminal device meets at least one of the foregoing six specified conditions, the terminal device actively performs cell handover. After the cell handover, a link quality parameter of the data link obtained by the terminal device again still does not meet the specified condition, and it indicates that the 5G system is unavailable.

Case 1.5: After the terminal device recovers the network by using at least one stage of reestablishment policies in a doRecovery mechanism, a link quality parameter of the data link of the terminal device still does not meet the specified condition.

When the terminal device meets Case 1.5, the network handover method may be understood as: When the link quality parameter of the terminal device meets at least one of the foregoing six specified conditions, after the terminal device recovers the network by using at least one stage of reestablishment policies, namely, querying a route, reconfiguring the route, re-registration, and enabling/disabling an airplane mode, a link quality parameter of the data link obtained by the terminal device again still does not meet the specified condition, and it indicates that the 5G system is unavailable.

Figure 5A:
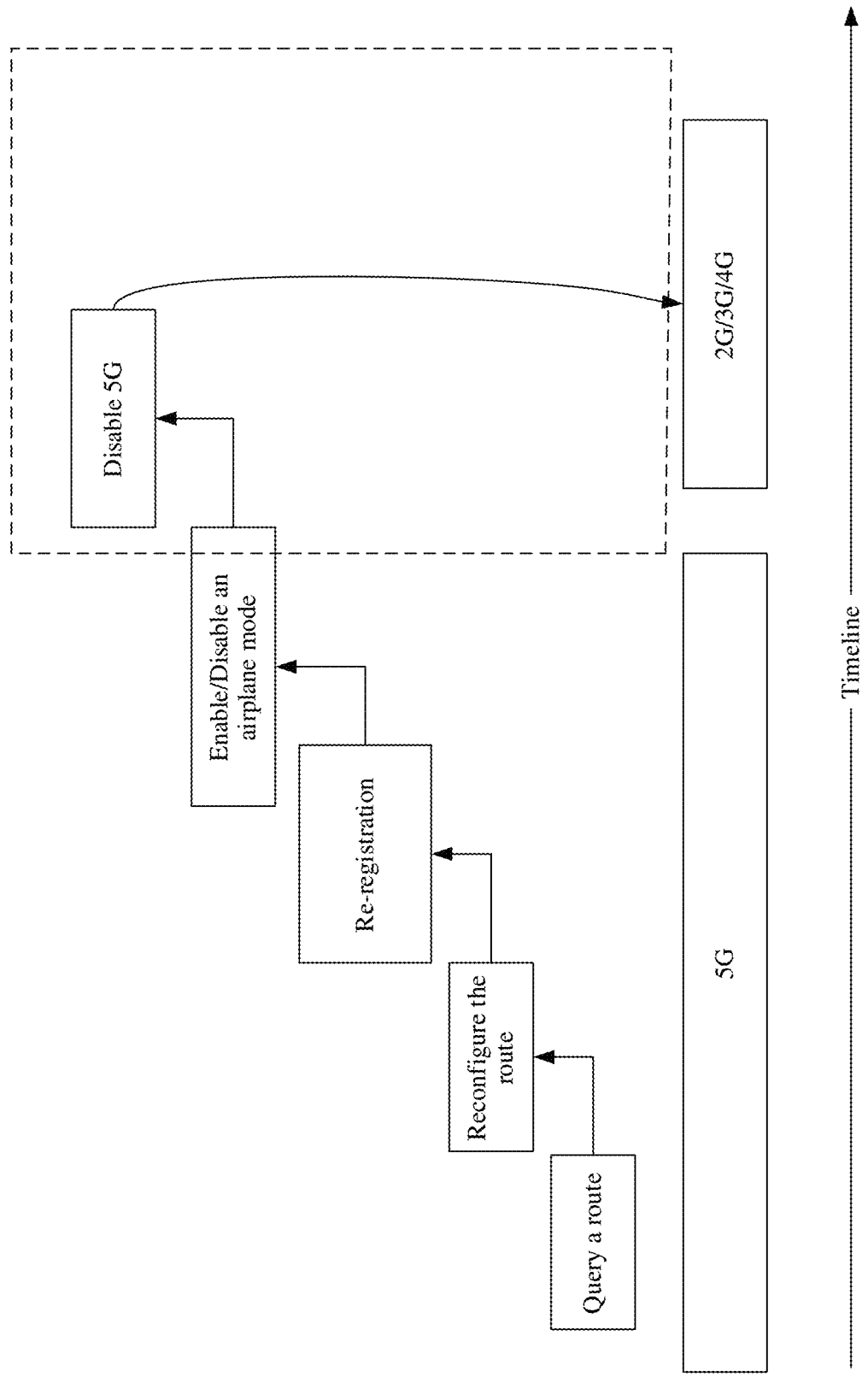
FIG. 5A and FIG. 5C are schematic diagrams of a network handover policy according to an embodiment of this application.

Specifically, in Case 1.5, in a possible implementation, as shown in FIG. 5A, when the link quality parameter of the terminal device meets at least one of the foregoing six specified conditions, the terminal device recovers the network by enabling reestablishment policies, namely, querying a route, reconfiguring the route, re-registration, and enabling/disabling an airplane mode, stage-by-stage. If the link quality parameter of the data link still does not meet the specified condition, it indicates that the currently accessed 5G system is unavailable, and the terminal device may hand over from the 5G system to any non-5G system such as a 2G/3G/4G system.

Figure 5B:
FIG. 5B(a), FIG. 5B(b), FIG. 5B(c), FIG. 5B(d), and FIG. 5B(e) are schematic diagrams of a group of interfaces according to an embodiment of this application.
Figure 5B:
Figure 5B:
Figure 5B:
Figure 5B:
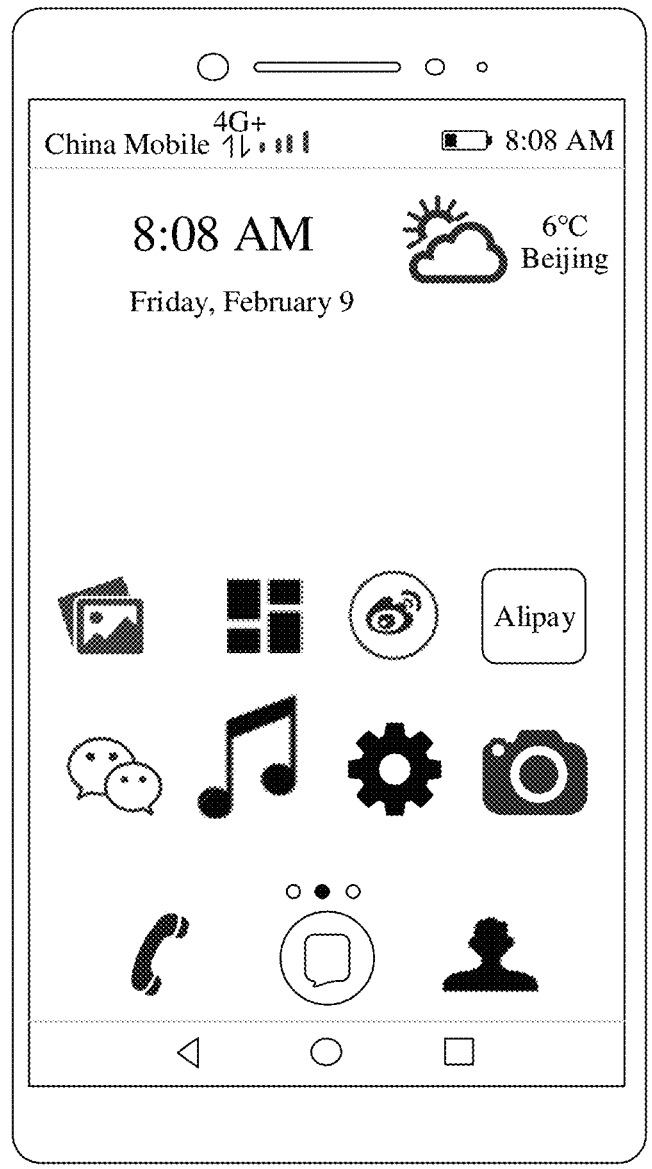

For example, when the serving cell in which the mobile phone is currently located is not covered by the 5G network, the network signal icon in the status bar indicates that currently there is only uplink transmission but no downlink transmission, as shown in FIG. 5B(a). When the transmission status remains unchanged in a period of time (for example, 20 seconds), the mobile phone determines that the specified condition is met, and therefore recovers the network by enabling reestablishment policies, namely, querying a route, reconfiguring the route, re-registration, and enabling/disabling an airplane mode. In this case, the network signal icon of the mobile phone may be that as shown in FIG. 5B(b), and is used to indicate that currently there is no uplink transmission and no downlink transmission. Then, the status bar of the mobile phone may be that as shown in FIG. 5B(c), that is, four bars of signal strength all disappear. Then, the mobile phone may fail to find a network at all. The status bar is that as shown in FIG. 5B(d). Finally, the mobile phone hands over to the 4G system. After the mobile phone hands over to the 4G system, a network status may still be that as shown in FIG. 5B(e), that is, data service transmission recovers to a normal status.

Figure 5C:
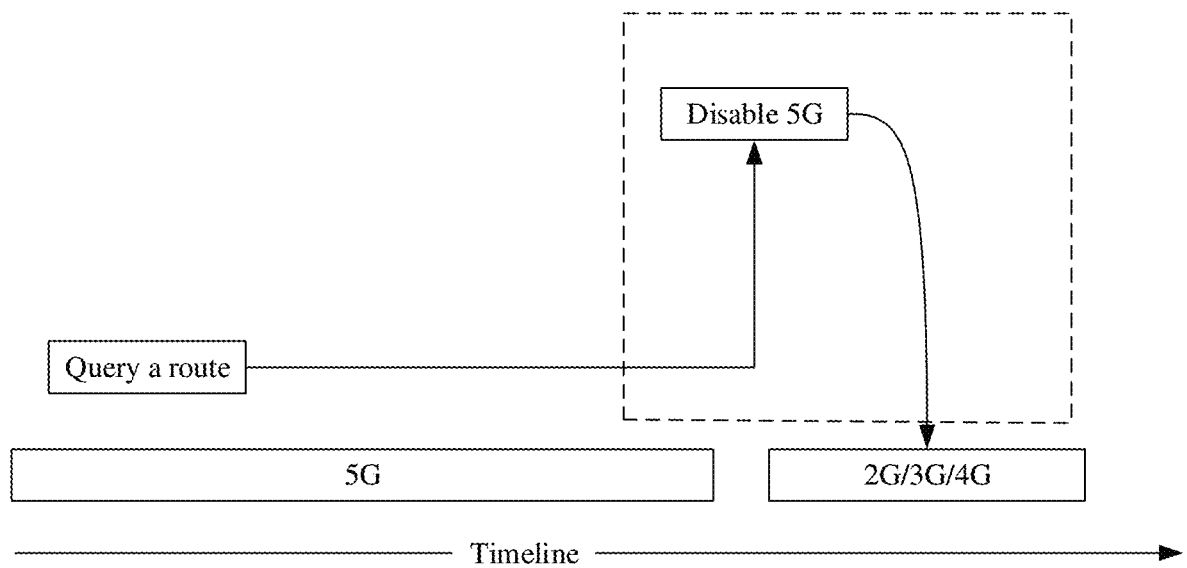

In Case 1.5, in another possible implementation, as shown in FIG. 5C, when the link quality parameter of the terminal device meets at least one of the foregoing six specified conditions, the terminal device recovers the network only by enabling a first-stage reestablishment policy (namely, querying a route) in the doRecovery mechanism. If the link quality parameter of the data link still does not meet the specified condition, it indicates that the currently accessed 5G system is unavailable, and the terminal device may hand over from the 5G system to any non-5G system such as a 2G/3G/4G system.

In Case 1.5, in another possible implementation, the terminal device may recover the network by enabling a first-stage reestablishment policy and a second-stage reestablishment policy (namely, querying a route and reconfiguring the route) in the doRecovery mechanism stage-by-stage. After querying the route and reconfiguring the route, if the link quality parameter of the data link still does not meet the specified condition, the terminal device hands over from the 5G system to the 2G/3G/4G system. Alternatively, the terminal device may recover the network by enabling a first-stage reestablishment policy, a second-stage reestablishment policy, and a third-stage reestablishment policy (namely, querying a route, reconfiguring the route, and re-registration) in the doRecovery mechanism stage-by-stage. After the foregoing processing, if the link quality parameter of the data link still does not meet the specified condition, the terminal device hands over from the 5G system to any non-5G system such as a 2G/3G/4G system.

It should be noted that, in this embodiment of this application, when the link quality parameter of the terminal device meets at least one of the foregoing six specified conditions, the terminal device may perform network handover when at least two of the foregoing cases are met. For example, when the link quality parameter of the terminal device meets at least one of the foregoing six specified conditions, and the terminal device further meets Case 1.1 and Case 1.4, the terminal device determines that the current 5G system is unavailable, and performs network handover.

For example, the following provides three specific implementations with reference to the foregoing cases. It should be noted that actual application is not limited to the following three implementations.

Implementation 1

Figure 6A:
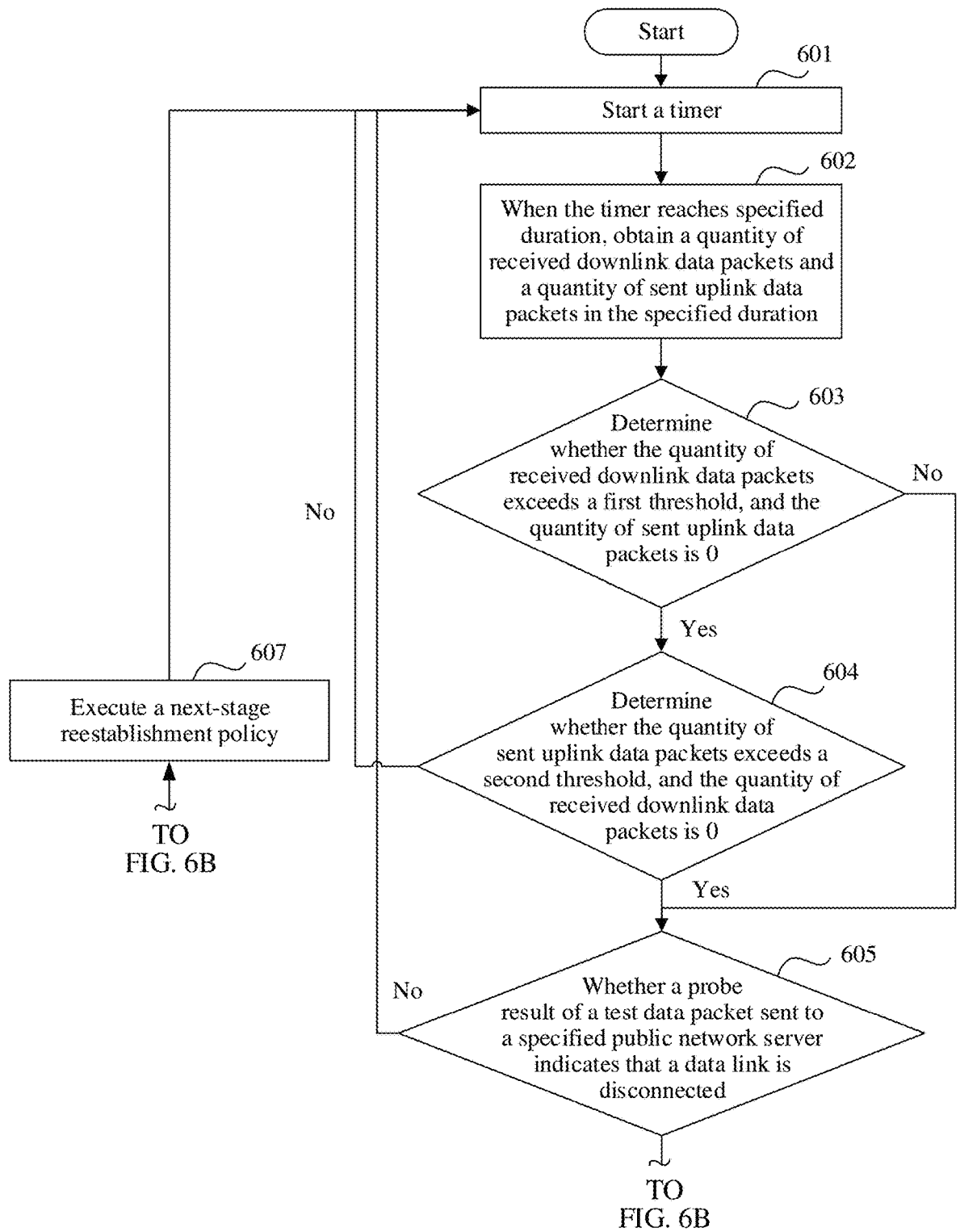
FIG. 6A and FIG. 6B are a schematic flowchart of a network handover method 1 according to an embodiment of this application.
Figure 6B:
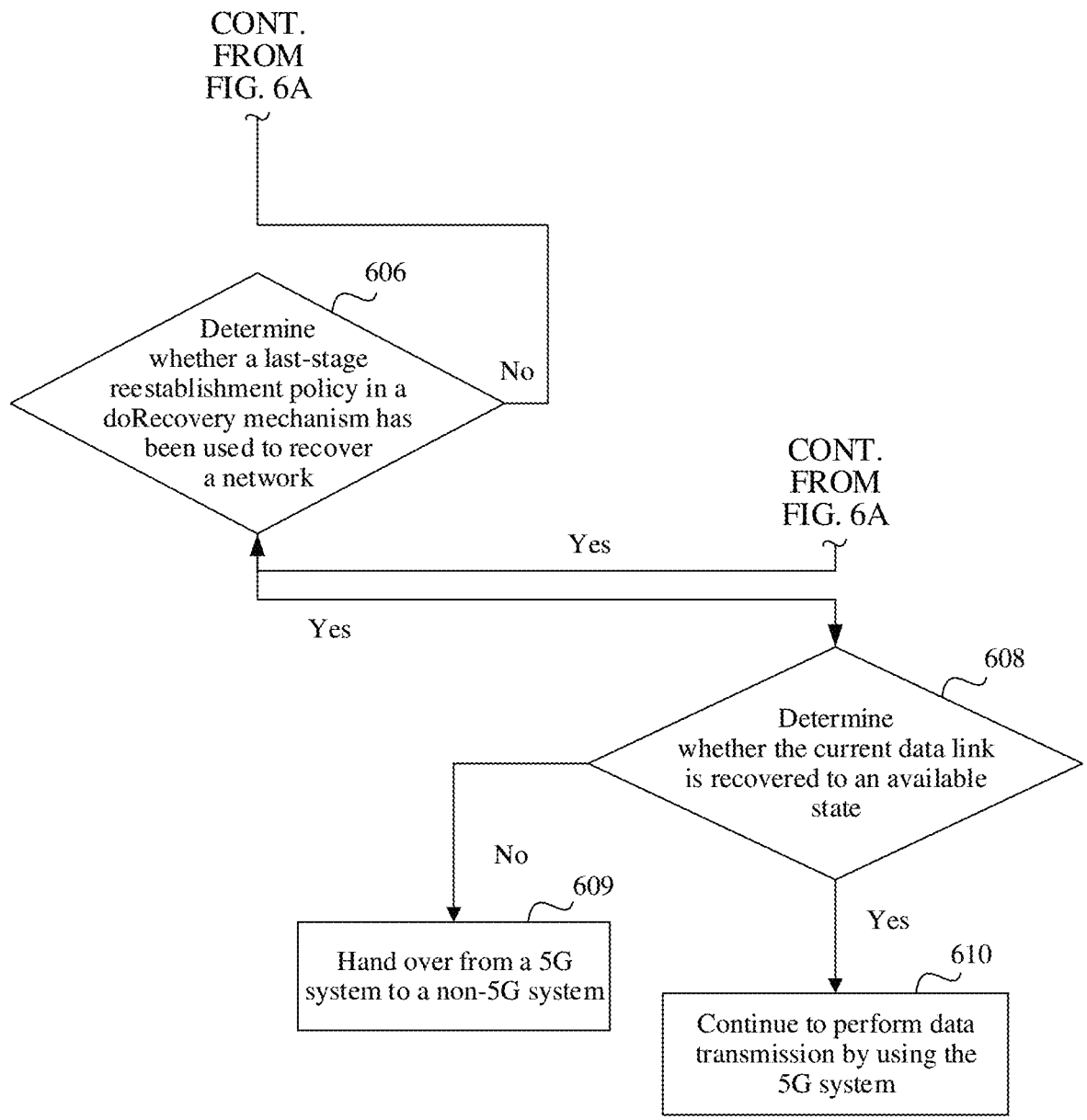

In this embodiment of this application, after the data service of the terminal device is activated, the terminal device immediately starts a periodic timer. When the timer reaches the specified duration, the terminal device obtains the link quality parameter of the data link in the period of time, and determines, based on the link quality parameter, whether the network interface card of the terminal device is in a single-passthrough state. If determining that the network interface card of the terminal device is in the single-passthrough state, the terminal device further performs verification by sending a test data packet. If a probe result of the test data packet still indicates that the data link is disconnected, the terminal device determines that the 5G system is unavailable, and performs recovery by using the reestablishment policies in the doRecovery mechanism. If the recovery still fails, the terminal device performs network handover. For example, as shown in FIG. 6A and FIG. 6B, a specific implementation procedure of Implementation 1 includes the following steps.

Step 601: After a data service of a terminal device is activated, start a timer. For example, specified duration of the timer is 10 seconds.

Step 602: When the timer reaches the specified duration (for example, 10 seconds), the terminal device obtains a quantity of received downlink data packets and a quantity of sent uplink data packets in the specified duration.

Step 603: The terminal device determines whether a link quality parameter of a data link meets a condition in the specified duration, where the condition is as follows: the quantity of received downlink data packets exceeds a first threshold, and the quantity of sent uplink data packets is 0; and if the link quality parameter of the data link meets the condition in the specified duration, it indicates that a network interface card of the terminal device has a downlink data packet but no uplink data packet, and step 605 is performed; or if the link quality parameter of the data link does not meet the condition in the specified duration, step 604 is performed.

Step 604: The terminal device continues to determine whether the link quality parameter of the data link meets a condition in the specified duration, where the condition is as follows: a quantity of uplink data packets sent by the terminal device exceeds a second threshold, and the quantity of received downlink data packets is 0; and if the link quality parameter of the data link meets the condition in the specified duration, it indicates that the network interface card of the terminal device has an uplink data packet but no downlink data packet, and step 605 is performed; or if the link quality parameter of the data link does not meet the condition in the specified duration, step 601 is performed.

Step 605: Determine whether a probe result of a test data packet (for example, a ping data packet) sent by the terminal device to a specified public network server indicates that the data link is disconnected; and if the probe result of the test data packet indicates that the data link is disconnected, it indicates that a current 5G system is unavailable, and step 606 is performed; or if the probe result of the test data packet indicates that the data link is connected, step 601 is performed.

Step 606: The terminal device determines whether a last-stage reestablishment policy (for example, the last-stage reestablishment policy is enabling/disabling an airplane mode by default) in a doRecovery mechanism has been used to recover a network; and if the last-stage reestablishment policy has not been used to recover the network, performs step 607; or if the last-stage reestablishment policy has been used to recover the network, performs step 608.

Step 607: The terminal device executes a next-stage reestablishment policy, and returns to perform step 601.

In other words, the terminal device sequentially executes four stages of reestablishment policies in the doRecovery mechanism; obtains a link quality parameter of the data link again; and determines whether the link quality parameter of the data link meets the specified condition.

Step 608: The terminal device determines whether the current data link has been recovered to an available state; and if the current data link has not been recovered to an available state, performs step 609; or if the current data link has been recovered to an available state, performs step 610.

In other words, when the link quality parameter of the data link of the terminal device does not meet the specified condition, and data can be normally sent and received, it indicates that the data link is recovered to an available state; otherwise, it indicates that the data link is still unavailable.

Step 609: The terminal device hands over from the 5G system to a non-5G system.

Step 610: The terminal device continues to perform data transmission by using the 5G system.

It should be noted that, a sequence of step 603 and step 604 may be reversed in the foregoing embodiment, that is, step 604 may be performed before step 603.

It should be noted that, in step 606, the last-stage reestablishment policy in the doRecovery mechanism may alternatively be set to querying a route. In other words, the terminal device determines whether querying a route has been used to recover the network. If querying a route has not been used to recover the network, the terminal device recovers the network by querying a route. If querying a route has been used to recover the network, the terminal device determines whether the current data link has been recovered to an available state. If the current data link is still unavailable, the terminal device hands over from the 5G system to the non-5G system. In this method, the terminal device can trigger network handover in time when data link quality is poor. This improves terminal performance and ensures data service continuity.

In FIG. 6A and FIG. 6B, the terminal device first determines whether only a data packet can be sent or only a data packet can be received, that is, determines whether the network interface card of the terminal device is in a single-passthrough state. If the network interface card of the terminal device is in a single-passthrough state, the terminal device further detects the network. If a probe result still indicates that the data link is disconnected, it indicates that the data link of the current 5G system is unavailable. Therefore, the terminal device recovers the network according to the doRecovery mechanism. If the network still cannot be recovered, the terminal device hands over from the 5G system to the non-5G system. It can be learned that this method can ensure data service continuity and improve user experience.

Implementation 2

Figure 7A:
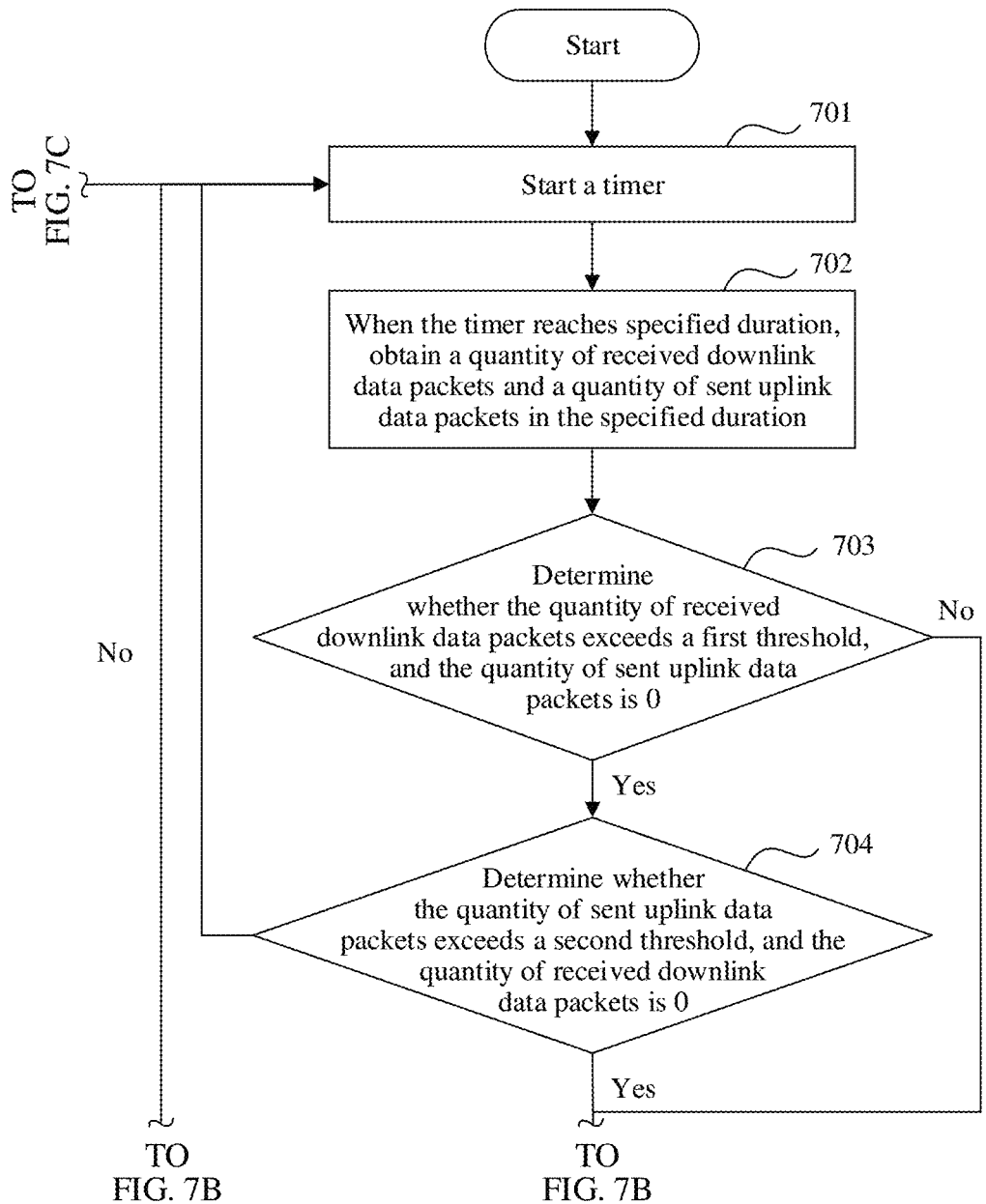
FIG. 7A, FIG. 7B, and FIG. 7C are a schematic flowchart of a network handover method 2 according to an embodiment of this application.
Figure 7B:
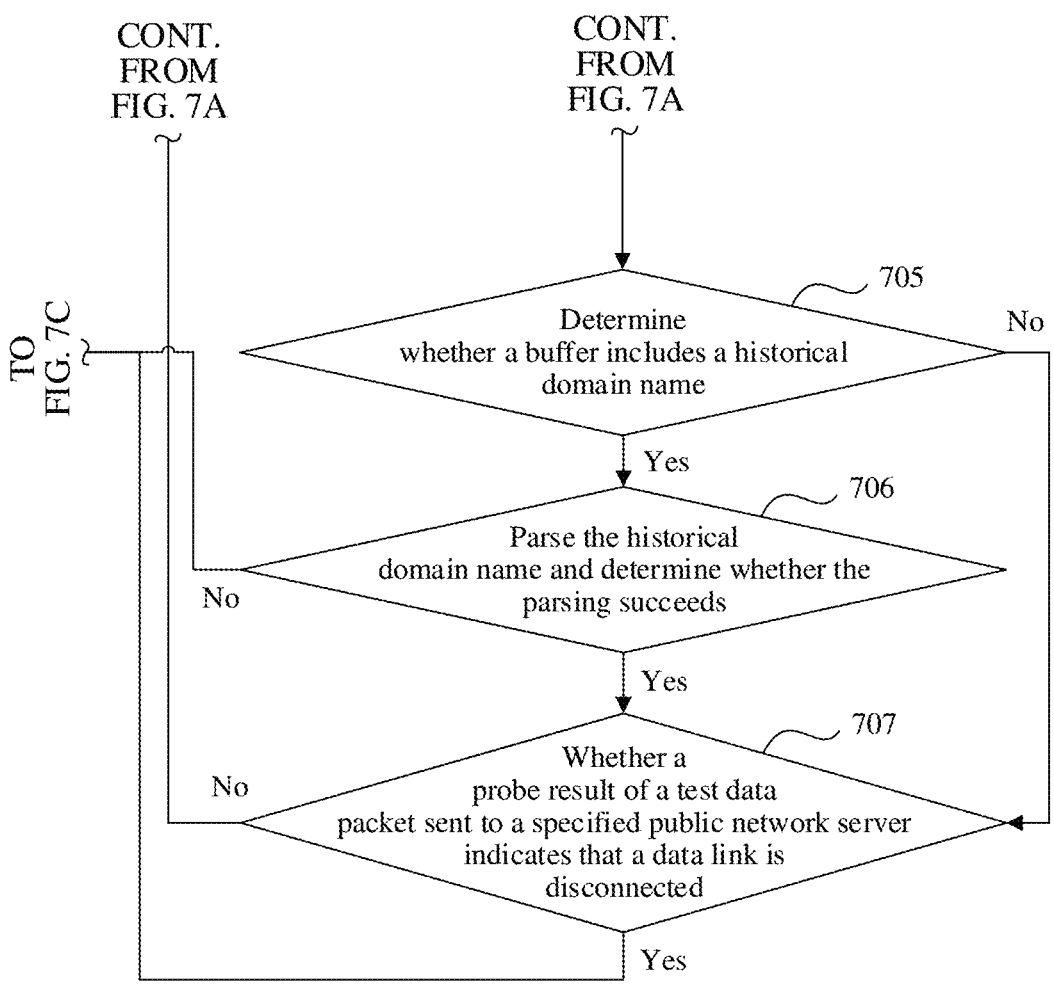
Figure 7C:
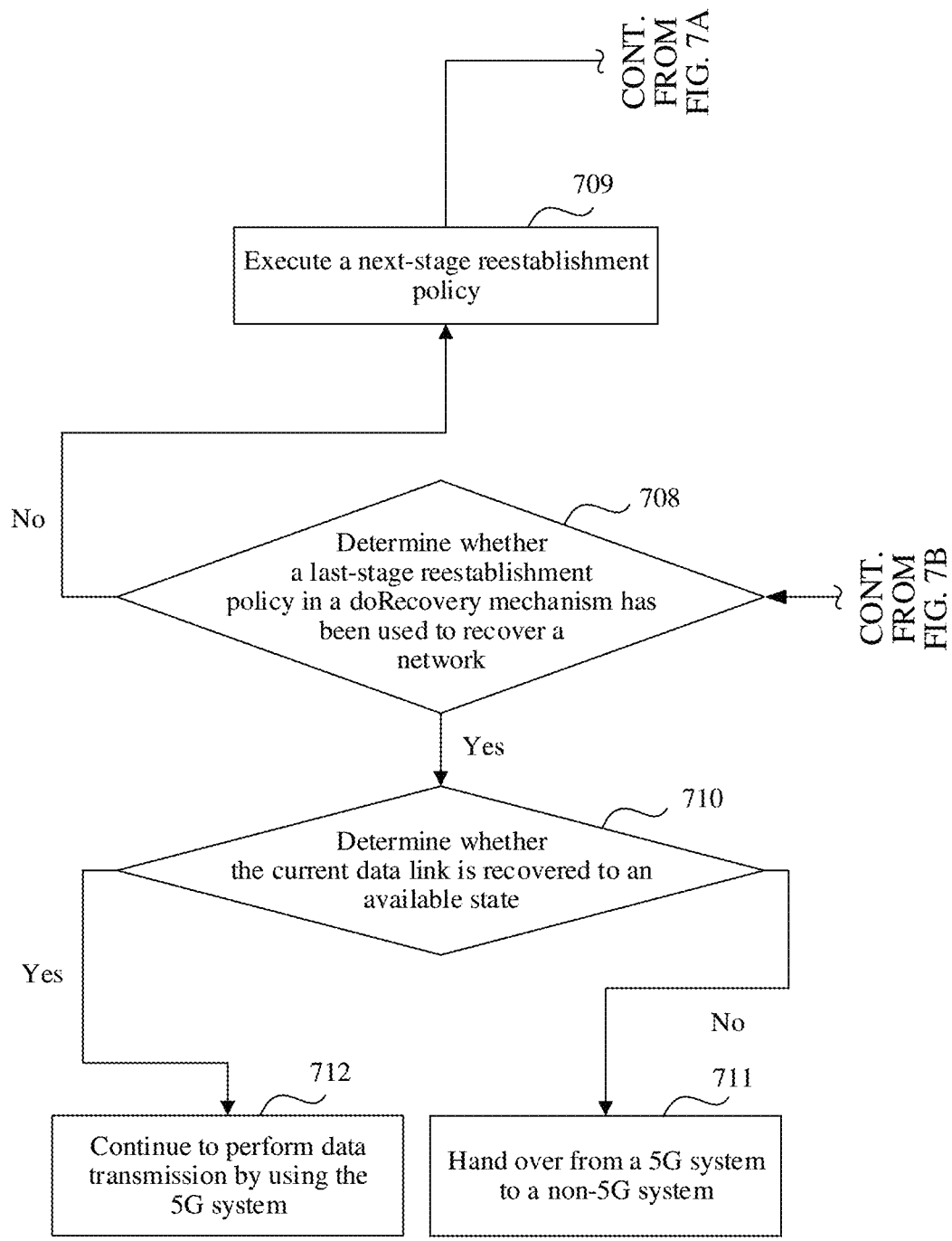

In this embodiment of this application, after the data service of the terminal device is activated, the terminal device immediately starts a periodic timer. When the timer reaches the specified duration, the terminal device obtains the link quality parameter of the data link in the period of time, and determines, based on the link quality parameter, whether the network interface card of the terminal device is in a single-passthrough state. If the terminal device determines that the network interface card of the terminal device is in a single-passthrough state, the terminal device further sends a test data packet for verification. Because it is uncertain whether the terminal device currently accesses a public network or a private network, when the terminal device currently accesses a private network, if the terminal device directly sends a test data packet to a specified public network server, a test result cannot indicate whether the private network is connected. Therefore, in this embodiment of this application, before sending the test data packet to the public network server, the terminal device first determines whether a historical domain name exists; and if the historical domain name does not exist, sends the test data packet to the specified public network server, or if the historical domain name exists, parses the historical domain name. For example, as shown in FIG. 7A, FIG. 7B, and FIG. 7C, a specific implementation procedure of Implementation 2 includes the following steps.

Step 701: A terminal device starts a timer. For example, specified duration of the timer is 10 seconds.

Step 702: When the timer reaches the specified duration (for example, 10 seconds), the terminal device obtains a quantity of received downlink data packets and a quantity of sent uplink data packets in the specified duration.

Step 703: The terminal device determines whether a link quality parameter of a data link meets a condition in the specified duration, where the condition is as follows: the quantity of received downlink data packets exceeds a first threshold, and the quantity of sent uplink data packets is 0; and if the link quality parameter of the data link meets the condition in the specified duration, step 705 is performed; or if the link quality parameter of the data link does not meet the condition in the specified duration, step 704 is performed.

Step 704: The terminal device continues to determine whether the link quality parameter of the data link meets a condition in the specified duration, where the condition is as follows: a quantity of uplink data packets sent by the terminal device exceeds a second threshold, and the quantity of received downlink data packets is 0; and if the link quality parameter of the data link meets the condition in the specified duration, step 705 is performed; or if the link quality parameter of the data link does not meet the condition in the specified duration, step 701 is performed.

Step 705: The terminal device first determines whether a buffer has a historical domain name; and if the historical domain name exists, performs step 706; or if the historical domain name does not exist, performs step 707.

Step 706: When the buffer of the terminal device stores the historical domain name, the terminal device parses the historical domain name (for example, a historical domain name closest to a current moment), and determines whether the parsing succeeds; and if the parsing fails, performs step 708; or if the parsing succeeds, performs step 707.

Step 707: Determine whether a probe result of a test data packet (for example, a ping data packet) sent by the terminal device to a specified public network server indicates that the data link is disconnected; and if the probe result of the test data packet indicates that the data link is disconnected, step 708 is performed; or if the probe result of the test data packet indicates that the data link is connected, step 701 is performed.

Step 708: The terminal device determines whether a last-stage reestablishment policy (for example, the last-stage reestablishment policy is enabling/disabling an airplane mode by default) in a doRecovery mechanism has been used to recover a network; and if the last-stage reestablishment policy has not been used to recover the network, performs step 709; or if the last-stage reestablishment policy has been used to recover the network, performs step 710.

Step 709: The terminal device executes a next-stage reestablishment policy, and returns to perform step 701.

Step 710: The terminal device determines whether the current data link has been recovered to an available state; and if the current data link has not been recovered to an available state, performs step 711; or if the current data link has been recovered to an available state, performs step 712.

Step 711: The terminal device hands over from a 5G system to a non-5G system.

Step 712: The terminal device continues to perform data transmission by using the 5G system.

It should be noted that, a sequence of step 703 and step 704 may be reversed in the foregoing embodiment, that is, step 704 is performed before step 703.

It should be noted that, in step 708, the last-stage reestablishment policy in the doRecovery mechanism may be set to querying a route. In other words, the terminal device determines whether querying a route has been used to recover the network. If querying a route has not been used to recover the network, the terminal device recovers the network by querying a route. If querying a route has been used to recover the network, the terminal device determines whether the current data link has been recovered to an available state. If the current data link is still unavailable, the terminal device hands over from the 5G system to the non-5G system. In this method, the terminal device can trigger network handover in time when data link quality is poor. This improves terminal performance and ensures data service continuity.

In this embodiment of this application, the terminal device first determines whether only a data packet can be sent or only a data packet can be received. If only a data packet can be sent or only a data packet can be received, the terminal device further detects the network. A detection manner includes two steps. Step 1: Parse the historical domain name. If the parsing fails, it indicates that the data link between the terminal device and the accessed server is disconnected. Step 2: Send the detection data packet to the public network server. If the probe result still indicates that the data link is disconnected, it indicates that the data link of the current 5G system is unavailable. Therefore, the network may further be recovered according to the doRecovery mechanism. If the network cannot be recovered, the terminal device hands over from the 5G system to the 4G system. It can be learned that this method can ensure data service continuity and improve user experience.

Implementation 3

Figure 8:
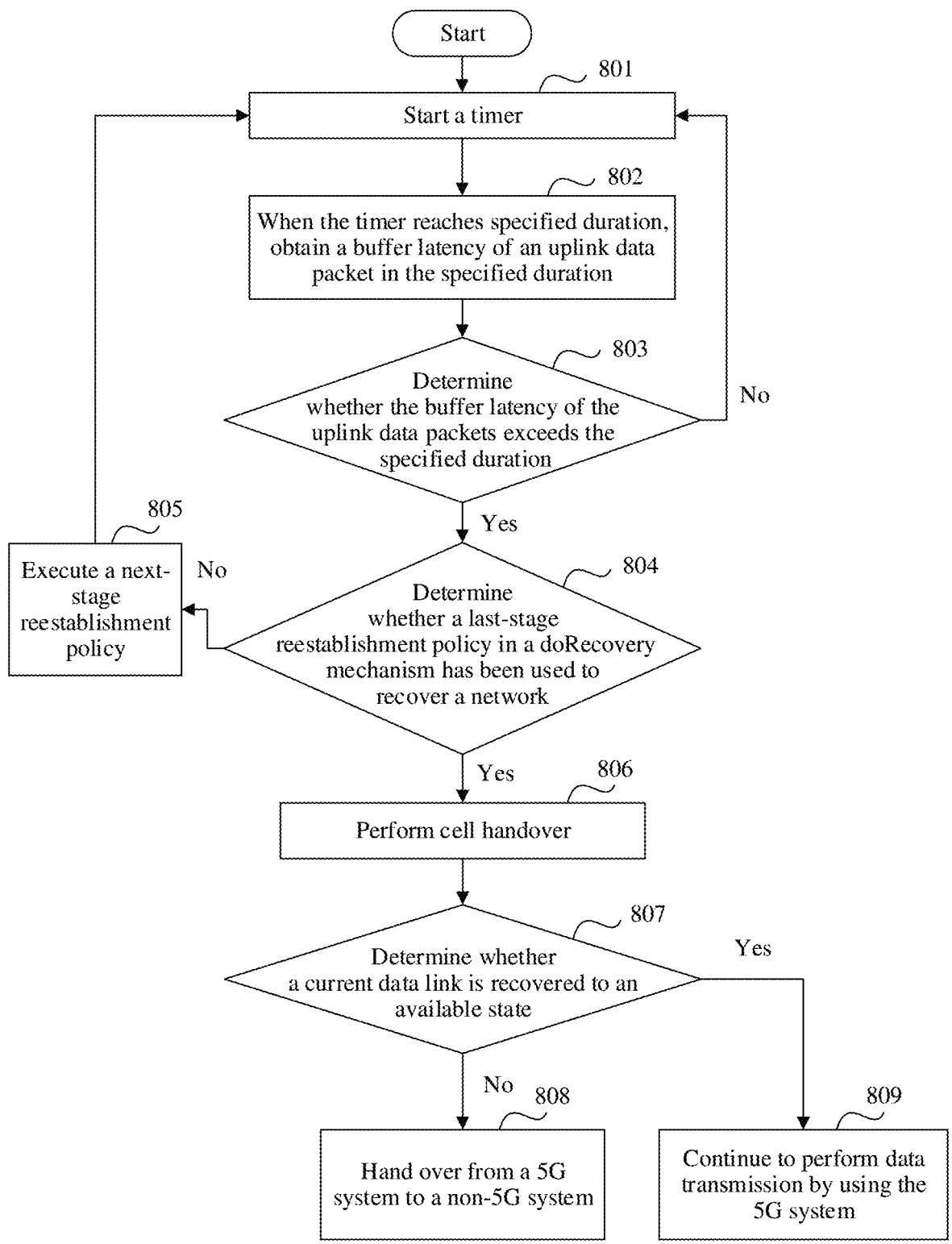
FIG. 8 is a schematic flowchart of a network handover method 3 according to an embodiment of this application.

In this embodiment of this application, after the data service of the terminal device is activated, the terminal device immediately starts a periodic timer. When the timer reaches the specified duration, the terminal device obtains the link quality parameter of the data link in the period of time, and determines a buffer latency of an uplink data packet based on the link quality parameter. If the buffer latency of the uplink data packet exceeds the specified duration, a network fault may occur. For example, when an obtained buffer latency of an uplink data packet of a video application currently running on a mobile phone exceeds 10 seconds, the terminal device determines that a current network is faulty. In this scenario, the network interface card may not be in a single-passthrough state, that is, there are both an uplink data packet and a downlink data packet, but a quantity of uplink data packets is much greater than a quantity of downlink data packets. Therefore, the data link is connected, but transmission of the data packet is not normal. Therefore, in this embodiment of this application, recovery is further performed by using the reestablishment policies in the doRecovery mechanism. If the recovery still fails, the terminal device performs network handover. For example, as shown in FIG. 8, a specific implementation procedure of Implementation 3 includes the following steps.

Step 801: A terminal device starts a timer. For example, specified duration of the timer is 10 seconds.

Step 802: When the timer reaches the specified duration (for example, 10 seconds), the terminal device obtains a buffer latency of an uplink data packet in the specified duration.

Step 803: The terminal device determines whether a link quality parameter of a data link meets a condition in the specified duration, where the condition is as follows: the buffer latency of the uplink data packet of the terminal device exceeds the specified duration. If the buffer latency of the uplink data packet of the terminal device exceeds the specified duration, step 804 is performed; or if the buffer latency of the uplink data packet of the terminal device does not exceed the specified duration, step 801 is performed.

Step 804: The terminal device determines whether a last-stage reestablishment policy in a doRecovery mechanism has been used to recover a network; and if the last-stage reestablishment policy has not been used to recover the network, performs step 805; or if the last-stage reestablishment policy has not been used to recover the network, performs step 806.

Step 805: The terminal device executes a next-stage reestablishment policy, and returns to perform step 801.

Step 806: The terminal device performs cell handover.

Step 807: The terminal device determines whether the current data link has been recovered to an available state; and if the current data link has not been recovered to an available state, performs step 808; or if the current data link has been recovered to an available state, performs step 809.

Step 808: The terminal device hands over from a 5G system to a non-5G system.

Step 809: The terminal device continues to perform data transmission by using the 5G system.

It should be noted that, a sequence of step 803 and step 806 may be reversed in the foregoing embodiment, that is, step 806 is performed before step 803.

In this embodiment of this application, the terminal device first determines whether the buffer latency of the uplink data packet is greater than the specified duration. If the buffer latency of the uplink data packet is greater than the specified duration, the terminal device further recovers the network according to the doRecovery mechanism, cell handover, and the like. If the network cannot be recovered, it indicates that the data link of the current 5G system is unavailable, and therefore the terminal device hands over from the 5G system to the non-5G system such as a 2G/3G/4G system. It can be learned that this method can ensure data service continuity and improve user experience.

The following specifically describes a network handover manner of handing over from a 5G system to a non-5G system in the foregoing embodiment.

Handover manner 1: The 5G system is non-standalone (non-standalone, NSA) networking, and the terminal device currently accesses a heterogeneous communication system (namely, an EN-DC system) including an NR system and an LTE system.

In a possible case, when the terminal device is in a connected state, the terminal device hands over to an LTE network by initiating a second cell group failure (second cell group failure, SCG failure). In other words, the terminal device sends capability information to a network device, where the capability information indicates that the terminal device does not currently support a 5G system.

In another case, when the terminal device is in an idle state, the terminal device suppresses reporting of a measurement result of the NR system, and skip enabling a random access function of the NR system, so that the terminal device accesses the non-5G system in an autonomous network search manner.

Handover manner 2: The 5G system is NSA, and the terminal device currently accesses a heterogeneous communication system including an NR system and a non-LTE system, for example, a dual connectivity mode including an NR system and an E-UTRA (terrestrial radio access (UMTS Terrestrial Radio Access, UTRA) in LTE is referred to as E-UTRA) system.

In a possible case, when the terminal device is in a connected state, the terminal device reduces measurement values of measurement reports of a 5G serving cell in an A-type handover event and a B-type handover event (for example, A1 to A5 and B1/B2), so that the terminal device accesses the non-5G system in an autonomous network search manner.

In another possible case, when the terminal device is in an idle state, the terminal device reduces a network selection priority of the NR system, and suppresses measurement of a B-type handover event of a measurement report of a 5G serving cell in a period of time.

Handover manner 3: If the 5G system is standalone (standalone, SA) networking, the terminal device may hand over to the non-5G system by initiating an SCG failure, for example, hand over to an LTE system.

Figure 9:
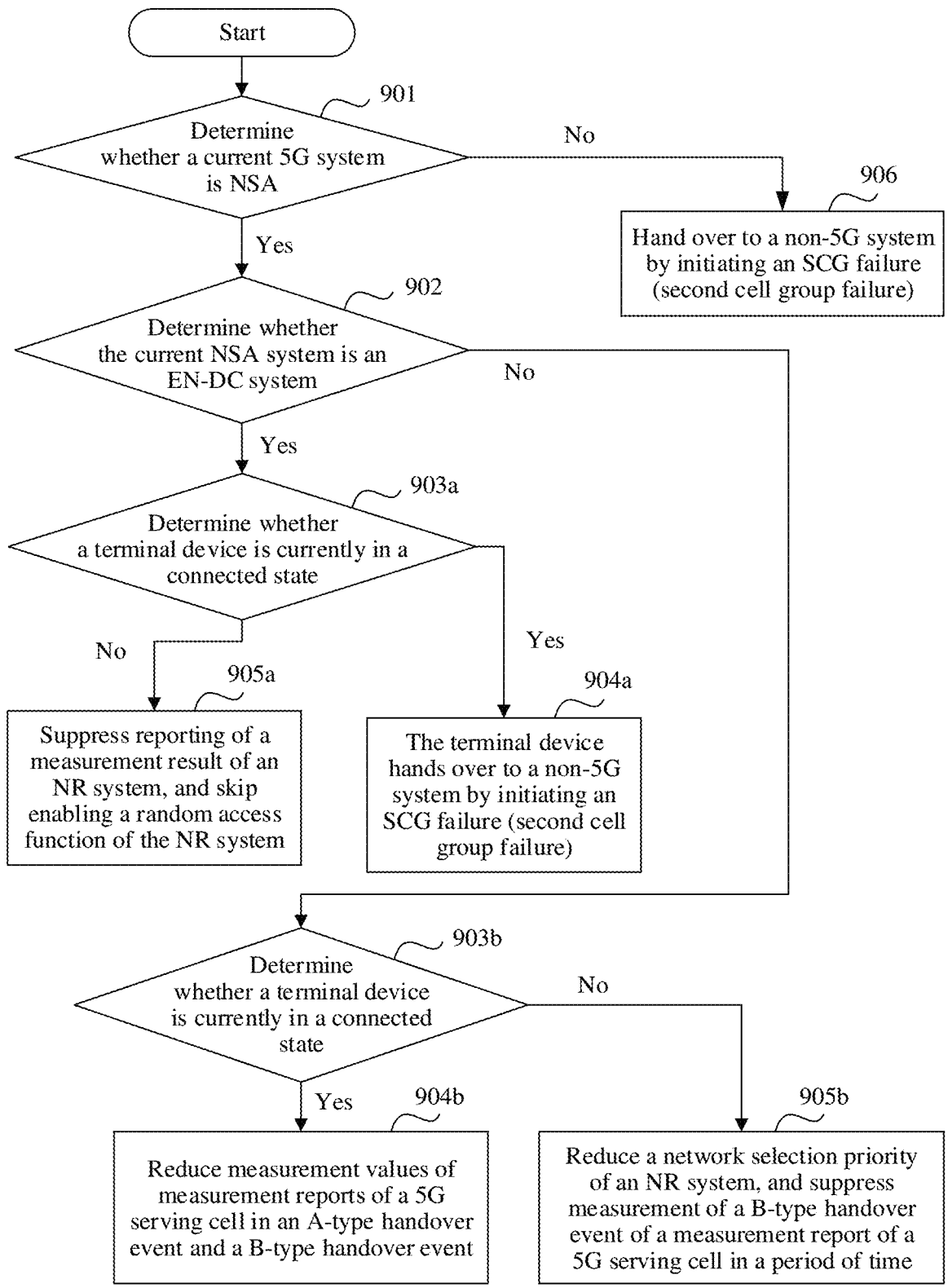
FIG. 9 is a schematic flowchart of another network handover method 3 according to an embodiment of this application.

Specifically, for Implementation 1 to Implementation 3, an embodiment of this application further provides a method procedure shown in FIG. 9. The terminal device may be handed over from a 5G system to a non-5G system by using the method shown in FIG. 9A, FIG. 9B, and FIG. 9C.

Step 901: A terminal device determines whether a current 5G system is NSA. If the current 5G system is NSA, step 902 is performed. If the current 5G system is not NSA, step 905a is performed.

Step 902: The terminal device determines whether the current NSA system is an EN-DC system; and if the current NSA system is an EN-DC system, performs step 903a; or if the current NSA system is not an EN-DC system, performs step 903b.

Step 903a: The terminal device determines whether the terminal device is currently in a connected state; and if the terminal device is currently in a connected state, performs step 904a; or if the terminal device is not in a connected state, performs step 905a.

Step 904a: If the terminal device is currently in a connected state, the terminal device hands over to a non-5G system by initiating an SCG failure.

Specifically, if the terminal device is currently an option 3 communication system and is in a connected state, the terminal device hands over to an LTE system by initiating the SCG failure. If the terminal device is currently an option 7 communication system, the terminal device directly suppresses reporting of a measurement result of an NR system.

Step 905a: If the terminal device is not in a connected state (namely, an idle state), the terminal device suppresses reporting of a measurement result of an NR system, and skips enabling a random access function of the NR system, so that the terminal device accesses the non-5G system in an autonomous network search manner.

Specifically, if the terminal device is currently an option 3 communication system and is not in a connected state, the terminal device suppresses reporting of the measurement result of the NR system, and skips enabling the random access function of the NR system. If the terminal device is currently an option 7 communication system, the terminal device directly suppresses reporting of the measurement result of the NR system.

Step 903b: The terminal device determines whether the terminal device is currently in a connected state; and if the terminal device is currently in a connected state, performs step 904b; or if the terminal device is not in a connected state, performs step 905b.

Step 904b: When the terminal device is in a connected state, the terminal device reduces measurement values of measurement reports of a 5G serving cell in an A-type handover event and a B-type handover event (for example, A1 to A5 and B1/B2), so that the terminal device accesses a non-5G system in an autonomous network search manner.

Step 905b: When the terminal device is in an idle state, the terminal device reduces a network selection priority of an NR system, and suppresses measurement of a B-type handover event of a measurement report of a 5G serving cell in a period of time.

Step 906: When the NR system is standalone networking SA, the terminal device hands over to a non-5G system by initiating an SCG failure.

Figure 10:
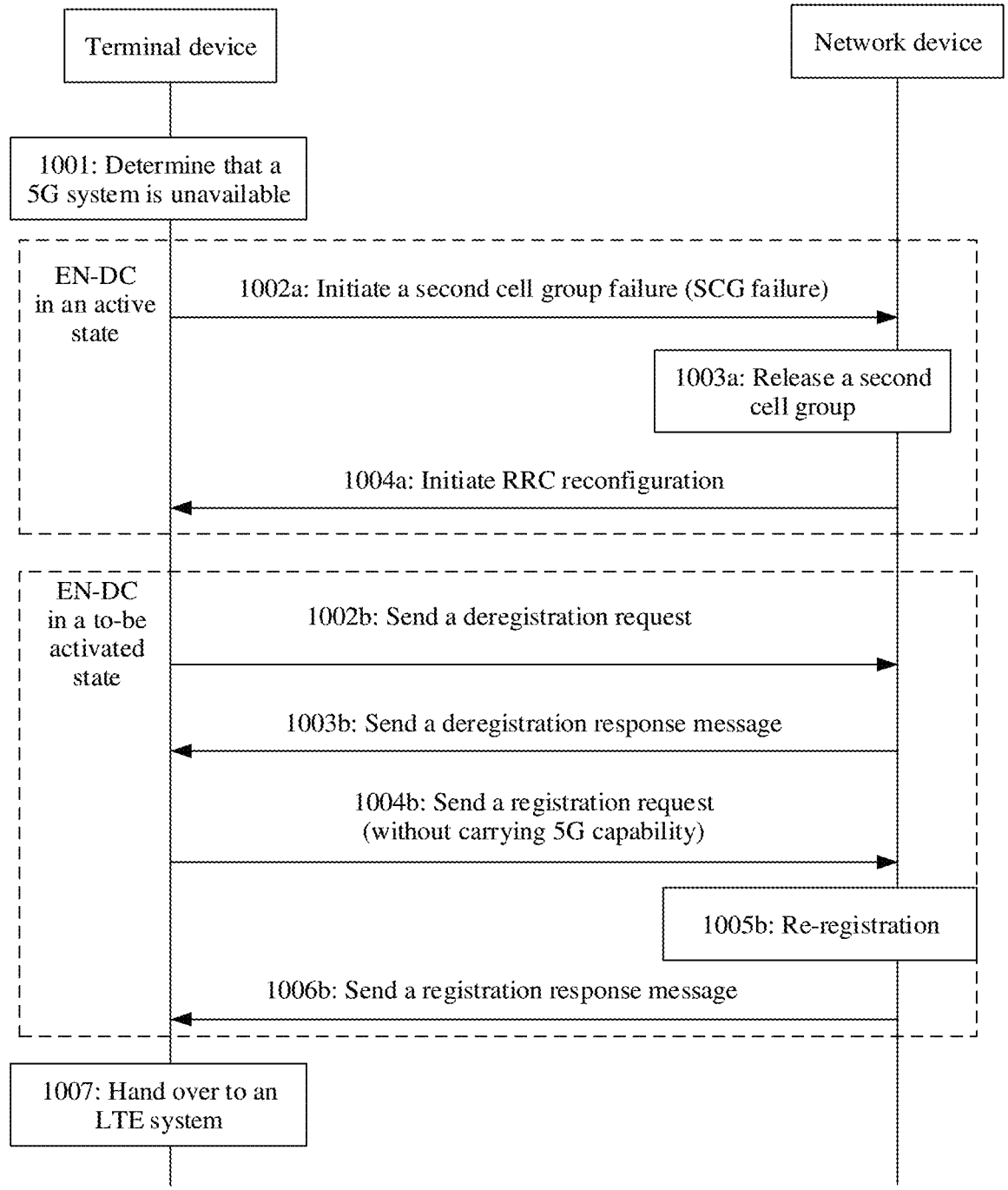
FIG. 10 is a schematic diagram of a network handover process of a terminal in an EN-DC system according to an embodiment of this application.

FIG. 10 is an example of a specific process in which a terminal device falls back from a 5G system to an LTE system in a scenario in which the terminal device accesses an EN-DC system.

Step 1001: A terminal device determines, by using the foregoing method, that a 5G system is unavailable.

Scenario 1

Step 1002a: If a current EN-DC system is in a dual-connectivity active state, the terminal device actively initiates a second cell group failure (SCG failure).

Step 1003a: A network device releases a second cell group.

Step 1004a: The network device initiates RRC reconfiguration.

Step 1007: The terminal device hands over from the 5G system to an LTE system.

Scenario 2

Step 1002b: If a current EN-DC system is in a to-be-activated state, namely, in an intermediate state, and an LTE system uses an NPDCP (5G PDCP entity), a terminal device initiates a deregistration request.

Step 1003b: A network device sends a deregistration response message.

Step 1004b: The terminal device initiates a new registration request again, where the new registration request does not carry 5G capability.

Step 1005b: The network device performs re-registration.

Step 1006b: The network device sends a registration response message to the terminal device.

Step 1007: The terminal device hands over from a 5G system to an LTE system.

Figure 11:
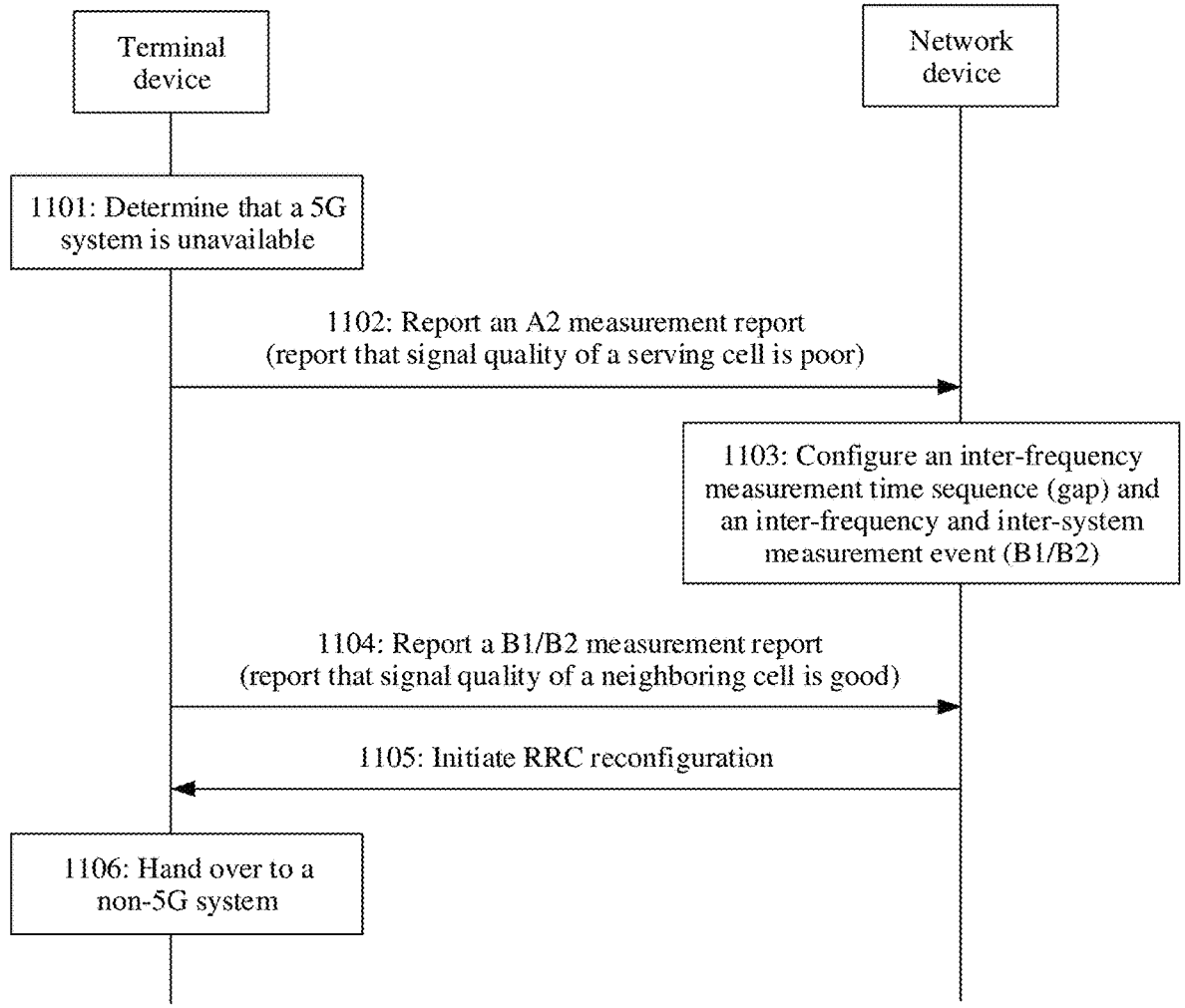
FIG. 11 is a schematic diagram of a network handover process of a terminal in a scenario in which 5G is SA according to an embodiment of this application.

FIG. 11 is an example of a specific process in which a terminal device falls back from a 5G system to an LTE system in a scenario in which the terminal device accesses a 5G system, where the 5G system is SA.

Step 1101: A terminal device determines, by using the foregoing method, that a 5G system is unavailable.

Step 1102: The terminal device reports an A2 measurement report of a current serving cell, where the A2 measurement report indicates that signal quality of the serving cell is poor.

Step 1103: A network device configures an inter-frequency measurement time sequence (gap) and an inter-frequency and inter-system measurement event (B1/B2).

Step 1104: The terminal device reports a B1/B2 measurement report, where the measurement report indicates that signal quality of a neighboring cell is good.

Step 1105: The network device initiates RRC reconfiguration, where the RRC reconfiguration redirects the terminal device to a non-5G system such as a 2G/3G/4G system.

Step 1106: The terminal device searches a network and redirects to the non-5G system such as a 2G/3G/4G system.

It can be learned that, in embodiments of this application, when determining that the data link quality is poor, the terminal device falls back to a low-standard network. This ensures that a user normally accesses the Internet, and ensures data service continuity.

Figure 12:
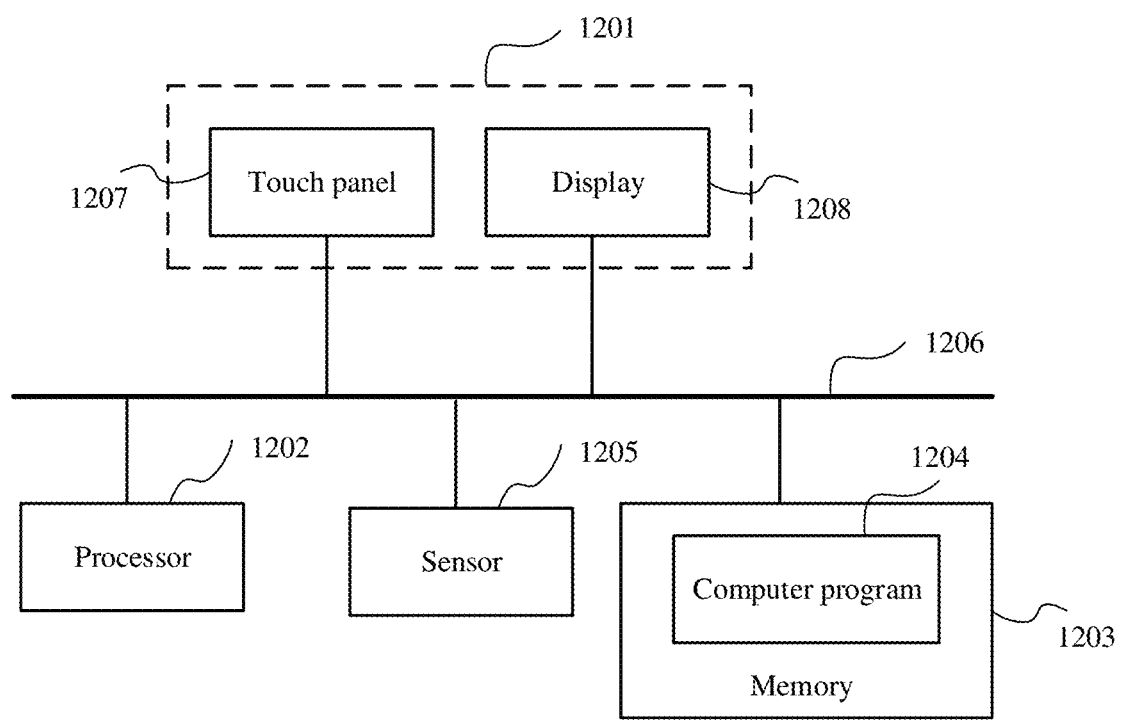
FIG. 12 is a schematic diagram of a structure of another terminal device according to an embodiment of this application.

In some other embodiments of this application, an embodiment of this application discloses a terminal device. As shown in FIG. 12, the terminal device may include a touchscreen 1201, where the touchscreen 1201 includes a touch panel 1207 and a display 1208; one or more processors 1202; a memory 1203; one or more application programs (which are not shown); and one or more computer programs

1204 and a sensor 1205. The foregoing components may be connected by using one or more communication buses 1206. The one or more computer programs 1204 are stored in the memory 1203 and are configured to be executed by the one or more processors 1202. The one or more computer programs 1204 include instructions, and the instructions may be used to perform steps in corresponding embodiments in FIG. 6A and FIG. 6B to FIG. 11.

Based on a same idea as the foregoing method embodiment, an embodiment of this application further provides a computer-readable storage medium. The computer-readable storage medium stores some instructions. When these instructions are invoked and executed by a computer, the computer may be enabled to complete the method in any one of the foregoing method embodiment or the possible designs of the foregoing method embodiment. In this embodiment of this application, the computer-readable storage medium is not limited. For example, the computer-readable storage medium may be a random access memory (random access memory, RAM) or a read-only memory (read-only memory, ROM).

Based on a same idea as the foregoing method embodiment, this application further provides a computer program product. When being invoked and executed by a computer, the computer program product can complete the method in any one of the foregoing method embodiment and the possible designs of the foregoing method embodiment.

Based on a same concept as the foregoing method embodiment, this application further provides a chip. The chip is coupled to a transceiver, and is configured to complete the method in any one of the foregoing method embodiments and the possible implementations of the foregoing method embodiments. "Coupling" means that two components are directly or indirectly combined with each other. The combination may be fixed or movable, and the combination may allow communication of fluid, electricity, an electrical signal, or another type of signal between the two parts.

The terminal device, the computer storage medium, the computer program product, or the chip in embodiments of this application is configured to perform a corresponding method provided above. Therefore, for beneficial effects that can be achieved, refer to the beneficial effects in the corresponding methods provided above. Details are not described herein again.

Based on the foregoing description of the implementations, a person skilled in the art may understand that for the purpose of convenient and brief description, division into the foregoing functional modules is merely used as an example for description. In actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into modules or units is merely logical function division and may be other division during actual implementation. For example, a plurality of units or components may be combined or integrated into another apparatus, or some features may be discarded or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, in other words, may be located at one place, or may be distributed on different places. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing content is merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A network handover method, comprising:
obtaining, by a terminal device, a link quality parameter of a data link of the terminal device, wherein the terminal device currently accesses a fifth generation communication (5G) system;
determining, by the terminal device, that the 5G system is unavailable in response to the link quality parameter meeting a specified condition; and
performing, by the terminal device, handing over from the 5G system to a non-5G system in response to determining that the 5G system is unavailable;
wherein the link quality parameter comprises a quantity of uplink data packets and a quantity of downlink data packets that are received in a specified duration; and
wherein the specified condition comprises at least one of a network card of the terminal device being in a first single passthrough state where the quantity of downlink data packets received in the specified duration by the terminal device exceeds a first threshold and a quantity of sent uplink data packets is o, or the network card of the terminal device being in a second single passthrough state where a quantity of uplink data packets sent by the terminal device in the specified duration, exceeds a second threshold and the quantity of received downlink data packets is o.

2. The method according to claim 1, wherein the determining that the 5G system is unavailable comprises:
sending a test data packet to a specified public network server in response to the link quality parameter meeting the specified condition; and
determining that the 5G system is unavailable in response to a probe result of the test data packet indicating that the data link is disconnected.

3. The method according to claim 1, wherein the determining that the 5G system is unavailable comprises:
parsing a historical domain name in a buffer in response to the link quality parameter meeting the specified condition;
determining that the 5G system is unavailable in response to the parsing failing;
sending a test data packet to a specified public network server in response to parsing succeeding; and
determining that the 5G system is unavailable in response to a probe result of the test data packet indicating that the data link is disconnected.

4. The method according to claim 1, further comprising performing, after determining that the 5G system is unavailable:
sequentially recovering a network using four stages of reestablishment policies comprising querying a route, reconfiguring the route, re-registration, and enabling/disabling an airplane mode; and
wherein the handing over from the 5G system to a non-5G system comprises handing over to the non-5G system in response to the sequentially recovering the network being unsuccessful.

5. The method according to claim 1, further comprising performing after determining that the 5G system is unavailable:
recovering a network by querying a route; and
wherein the handing over from the 5G system to a non-5G system comprises:
handing over to the non-5G system in response to the recovering the network being unsuccessful.

6. The method according to claim 1, wherein the 5G system is non-standalone networking (NSA), and the terminal device accesses a heterogeneous communication system comprising the 5G system and a long term evolution (LTE) system; and
wherein the handing over from the 5G system to the non-5G system comprises:
triggering a network device to indicate the terminal device to hand over to the LTE system by sending, to the network device, when the terminal device is in a connected state, capability information that the terminal device does not support the 5G system; and
suppressing reporting of a measurement result of the 5G system when the terminal device is in an idle state, and skipping enabling a random access function of the 5G system, wherein the suppressing the reporting of the measurement result and the skipping enabling the random access function causes the terminal device to access the LTE system in an autonomous network search manner.

7. The method according to claim 1, wherein the 5G system is standalone networking (SA); and
wherein the handing over from the 5G system to the non-5G system comprises:
triggering, by sending, to a network device, capability information that the terminal device does not support the 5G system, the network device to indicate the terminal device to hand over to the non-5G system.

8. A terminal device, comprising:
a processor; and
a non-transitory computer readable memory storing one or more computer programs for execution by the processor, the one or more computer programs including instructions to:
obtain a link quality parameter of a data link of the terminal device, wherein the terminal device currently accesses a fifth generation communications (5G) system;
determine that the 5G system is unavailable in response to the link quality parameter meeting a specified condition; and
hand over from the 5G system to a non-5G system in response to determining that the 5G system is unavailable;
wherein the link quality parameter comprises a quantity of uplink data packets and a quantity of downlink data packets that are received in a specified duration, and wherein the specified condition comprises a network card of the terminal device being in a first single passthrough state where the quantity of downlink data packets received in the specified duration by the terminal device exceeds a first threshold and a quantity of sent uplink data packets is 0, or the specified condition comprises the network card of the terminal device being in a second single passthrough state where a quantity of uplink data packets sent in the specified duration by the terminal device exceeds a second threshold and the quantity of received downlink data packets is 0.

9. The terminal device according to claim 8, wherein the program further includes instructions to:
send a test data packet to a specified public network server in response to the link quality parameter meeting the specified condition; and
determine that the 5G system is unavailable in response to a probe result of the test data packet indicating that the data link is disconnected.

10. The terminal device according to claim 8, wherein the program further includes instructions to:
parse a historical domain name in a buffer in response to the link quality parameter meeting the specified condition;
determine that the 5G system is unavailable in response to the parsing failing;
send a test data packet to a specified public network server in response to the parsing succeeding; and
determine that the 5G system is unavailable in response to a probe result of the test data packet indicating that the data link is disconnected.

11. The terminal device according to claim 8, wherein the program further includes instructions to:
sequentially recover a network using four stages of reestablishment policies comprising querying a route, reconfiguring the route, re-registration, and enabling/disabling an airplane mode; and
hand over to the non-5G system in response to the sequentially recovering the network being unsuccessful.

12. The terminal device according to claim 8, wherein the program further includes instructions to:
recover a network by querying a route; and
hand over to the non-5G system in response to the recovering the network being unsuccessful.

13. The terminal device according to claim 8, wherein the 5G system is non-standalone networking (NSA), and the terminal device accesses a heterogeneous communication system comprising the 5G system and a long term evolution (LTE) system; and wherein the program further includes instructions to:

triggering a network device to indicate the terminal device to hand over to the LTE system by sending, to the network device, when the terminal device is in a connected state, capability information that the terminal device does not support the 5G system; and suppressing reporting of a measurement result of the 5G system when the terminal device is in an idle state, and skipping enabling a random access function of the 5G system, wherein the suppressing the reporting of the measurement result and the skipping enabling the random access function causes the terminal device to access the LTE system in an autonomous network search manner.

14. The terminal device according to claim 8, wherein the 5G system is standalone networking (SA); and wherein the program further includes instructions to:

trigger a network device to indicate the terminal device to hand over to the non-5G system by sending, to the network device, capability information that the terminal device does not support the 5G system.

15. A chip, wherein the chip is coupled to a memory and is configured to execute a computer program stored in the memory, to perform:

obtaining a link quality parameter of a data link of a terminal device associated with the chip, wherein the terminal device currently accesses a fifth generation communication (5G) system;

determining that the 5G system is unavailable in response to the link quality parameter meeting a specified condition; and handing over from the 5G system to a non-5G system in response to determining that the 5G system is unavailable;

wherein the link quality parameter comprises a quantity of uplink data packets and a quantity of downlink data packets that are received in a specified duration; and wherein the specified condition comprises at least one of a network card of the terminal device being in a first single passthrough state where the quantity of downlink data packets received in the specified duration by the terminal device exceeds a first threshold and a quantity of sent uplink data packets is 0, or the network card of the terminal device being in a second single passthrough state where a quantity of uplink data packets sent by the terminal device in the specified duration, exceeds a second threshold and the quantity of received downlink data packets is 0.

16. The chip according to claim 15, wherein the determining that the 5G system is unavailable comprises:

sending a test data packet to a specified public network server in response to the link quality parameter meeting the specified condition; and determining that the 5G system is unavailable in response to a probe result of the test data packet indicating that the data link is disconnected.

17. The chip according to claim 15, wherein the determining that the 5G system is unavailable comprises:

parsing a historical domain name in a buffer in response to the link quality parameter meeting the specified condition;

determining that the 5G system is unavailable in response to the parsing failing;

sending a test data packet to a specified public network server in response to parsing succeeding; and determining that the 5G system is unavailable in response to a probe result of the test data packet indicating that the data link is disconnected.

18. The chip according to claim 15, further comprising performing, after determining that the 5G system is unavailable:

sequentially recovering a network using four stages of reestablishment policies comprising querying a route, reconfiguring the route, re-registration, and enabling/disabling an airplane mode; and wherein the handing over from the 5G system to a non-5G system comprises handing over to the non-5G system in response to the sequentially recovering the network being unsuccessful.

19. The chip according to claim 15, further comprising performing, after determining that the 5G system is unavailable:

recovering a network by querying a route; and wherein the handing over from the 5G system to a non-5G system comprises:

handing over to the non-5G system in response to the recovering the network being unsuccessful.

20. The chip according to claim 15, wherein the 5G system is non-standalone networking (NSA), and the terminal device accesses a heterogeneous communication system comprising the 5G system and a long term evolution (LTE) system; and wherein the handing over from the 5G system to the non-5G system comprises:

triggering a network device to indicate the terminal device to hand over to the LTE system by sending, to the network device, when the terminal device is in a connected state, capability information that the terminal device does not support the 5G system; and suppressing reporting of a measurement result of the 5G system when the terminal device is in an idle state, and skipping enabling a random access function of the 5G system, wherein the suppressing the reporting of the measurement result and the skipping enabling the random access function causes the terminal device to access the LTE system in an autonomous network search manner.

* * * * *

UNITED STATES PATENT AND TRADEMARK OFFICE
CERTIFICATE OF CORRECTION

PATENT NO. : 12,177,732 B2  
APPLICATION NO. : 17/761528  
DATED : December 24, 2024  
INVENTOR(S) : Lin et al.

Page 1 of 1

It is certified that error appears in the above-identified patent and that said Letters Patent is hereby corrected as shown below:

In the Claims

In Column 28, in Claim 1, Line 62, delete "o," and insert -- 0, --.

In Column 28, in Claim 1, Line 65, after "duration" delete ",".

In Column 28, in Claim 1, Line 67, delete "o." and insert -- 0. --.

In Column 31, in Claim 15, Line 49, after "duration" delete ",".

Signed and Sealed this  
Eleventh Day of February, 2025

Coke Morgan Stewart  
*Acting Director of the United States Patent and Trademark Office*